(12) United States Patent
Becker-Willinger et al.

(10) Patent No.: US 10,246,662 B2
(45) Date of Patent: Apr. 2, 2019

(54) PIGMENTED, FINE-STRUCTURED, TRIBOLOGICAL COMPOSITE MATERIAL

(71) Applicant: LEIBNIZ-INSTITUT FUER NEUE MATERIALIEN GEMEINNUETZIGE GMBH, Saarbruecken (DE)

(72) Inventors: Carsten Becker-Willinger, Saarbruecken (DE); Frank Hollmann, Biberach (DE); Christoph Kasper, Spiesen-Elversberg (DE)

(73) Assignee: Leibniz-Institut fuer Neue Materialien gemeinnuetzige GmbH, Saarbruecken (DE)

( * ) Notice: Subject to any disclaimer, the term of this patent is extended or adjusted under 35 U.S.C. 154(b) by 462 days.

(21) Appl. No.: 14/364,689

(22) PCT Filed: Dec. 20, 2012

(86) PCT No.: PCT/EP2012/076343
§ 371 (c)(1),
(2) Date: Jun. 12, 2014

(87) PCT Pub. No.: WO2013/092835
PCT Pub. Date: Jun. 27, 2013

(65) Prior Publication Data
US 2014/0329729 A1    Nov. 6, 2014

(30) Foreign Application Priority Data

Dec. 21, 2011 (DE) .................. 10 2011 056 761

(51) Int. Cl.
*C10M 169/04* (2006.01)
*B05D 3/02* (2006.01)
(Continued)

(52) U.S. Cl.
CPC ....... *C10M 169/044* (2013.01); *B05D 3/0254* (2013.01); *B05D 3/14* (2013.01);
(Continued)

(58) Field of Classification Search
None
See application file for complete search history.

(56) References Cited

U.S. PATENT DOCUMENTS 3,705,109 A    12/1972 Hausler et al.
3,809,442 A    5/1974 Peterson et al.
(Continued)

FOREIGN PATENT DOCUMENTS

DE    4212633 A1    10/1993
DE    103 26 815 A1    12/2004
(Continued)

OTHER PUBLICATIONS

English Abstract of JP 2005-330383, dated Dec. 2, 2005.
(Continued)

*Primary Examiner* — Alexandre F Ferre
(74) *Attorney, Agent, or Firm* — Cahn & Samuels, LLP

(57) ABSTRACT

A composition for producing a tribological composite material includes at least one platelet-shaped solid-state lubricant, at least one type of inorganic, platelet-shaped pigment particles, at least one surface-active compound which possesses at least one hydrophilic group and at least one hydrophobic group, and a curable binder system comprising at least one organic polymer or oligomer having one or more functional groups, or a precursor thereof.

22 Claims, 20 Drawing Sheets

(51) Int. Cl.
*B05D 3/14* (2006.01)
*C09D 5/02* (2006.01)
*C09D 5/16* (2006.01)
*C09D 7/40* (2018.01)
*C10M 103/00* (2006.01)

(52) U.S. Cl.
CPC ............ *C09D 5/027* (2013.01); *C09D 5/1618* (2013.01); *C09D 5/1662* (2013.01); *C09D 7/70* (2018.01); *C10M 169/04* (2013.01); *C10M 103/00* (2013.01); *C10M 2201/003* (2013.01); *C10M 2201/041* (2013.01); *C10M 2201/061* (2013.01); *C10M 2201/062* (2013.01); *C10M 2201/065* (2013.01); *C10M 2201/066* (2013.01); *C10M 2201/105* (2013.01); *C10M 2209/103* (2013.01); *C10M 2213/06* (2013.01); *C10M 2213/062* (2013.01); *C10M 2215/223* (2013.01); *C10M 2217/044* (2013.01); *C10M 2229/041* (2013.01); *C10N 2220/08* (2013.01); *C10N 2220/082* (2013.01); *C10N 2230/06* (2013.01); *C10N 2250/141* (2013.01)

(56) References Cited

U.S. PATENT DOCUMENTS

| | | |
|---|---|---|
| 4,694,038 A | 9/1987 | Burns et al. |
| 4,695,598 A | 9/1987 | Yamamoto et al. |
| 4,719,269 A | 1/1988 | Ando et al. |
| 4,898,905 A | 2/1990 | Kawakami et al. |
| 4,997,907 A | 3/1991 | Marten et al. |
| 5,258,441 A | 11/1993 | Nagahiro et al. |
| 5,312,716 A | 5/1994 | Unoki et al. |
| 5,352,831 A | 10/1994 | Flury et al. |
| 5,354,622 A | 10/1994 | Nakamaru et al. |
| 5,593,781 A | 1/1997 | Nass et al. |
| 5,624,887 A | 4/1997 | Nakamaru et al. |
| 5,789,523 A | 8/1998 | George et al. |
| 5,910,522 A | 6/1999 | Schmidt et al. |
| 6,369,147 B1 | 4/2002 | Polonka |
| 7,846,248 B2 | 12/2010 | Mirone et al. |
| 9,051,470 B2 | 6/2015 | de Oliveira et al. |
| 2003/0186060 A1 | 10/2003 | Rao et al. |
| 2004/0229759 A1 | 11/2004 | Joseph et al. |
| 2005/0065226 A1 | 3/2005 | Mirone et al. |
| 2006/0159909 A1 | 7/2006 | Aslan et al. |
| 2007/0068646 A1* | 3/2007 | Freti .......... D21F 1/483 162/352 |
| 2007/0259182 A1 | 11/2007 | Bujard et al. |
| 2008/0008838 A1* | 1/2008 | Arpac ............. C08G 18/3812 427/386 |
| 2008/0314284 A1 | 12/2008 | Li et al. |
| 2009/0072199 A1 | 3/2009 | Lewarchik et al. |
| 2009/0156736 A1 | 6/2009 | Fischer et al. |
| 2009/0226742 A1 | 9/2009 | Blum et al. |
| 2009/0277625 A1 | 11/2009 | Bai et al. |
| 2009/0324983 A1 | 12/2009 | Hackbarth et al. |
| 2010/0095868 A1 | 4/2010 | Kaupp et al. |
| 2010/0178308 A1 | 7/2010 | Iwasa et al. |
| 2011/0008399 A1 | 1/2011 | Bugnon et al. |
| 2011/0118384 A1* | 5/2011 | Bugnon ............. C09C 1/0021 523/171 |
| 2011/0133132 A1 | 6/2011 | Zhamu et al. |
| 2012/0125229 A1 | 5/2012 | Grüner et al. |
| 2012/0135209 A1 | 5/2012 | Becker et al. |
| 2014/0329729 A1 | 11/2014 | Becker-Willinger et al. |

FOREIGN PATENT DOCUMENTS

| | | |
|---|---|---|
| DE | 10326815 A1 | 12/2004 |
| DE | 102006062500 A1 | 7/2008 |
| DE | 60319674 T2 | 4/2009 |
| DE | 102009031266 A1 | 1/2011 |
| DE | 102009035673 A1 | 2/2011 |
| DE | 102009037323 A1 | 2/2011 |
| EP | 0387692 A2 | 9/1990 |
| EP | 0581185 A1 | 2/1994 |
| EP | 0590488 A1 | 4/1994 |
| EP | 1350817 A1 | 10/2003 |
| EP | 1548067 B1 | 8/2006 |
| EP | 1718690 A1 | 11/2006 |
| EP | 2426190 A1 | 3/2012 |
| EP | 2794769 B1 | 9/2016 |
| JP | S5411938 A | 1/1979 |
| JP | S62050368 A | 3/1987 |
| JP | H01-170670 A | 7/1989 |
| JP | 03205451 A | 9/1991 |
| JP | 04227778 A | 8/1992 |
| JP | 2002276665 A | 9/2002 |
| JP | 2005-330383 A | 12/2005 |
| JP | 2006328548 A | 7/2006 |
| JP | 2007-526366 A | 9/2007 |
| JP | 2011-252112 A | 12/2011 |
| JP | 2011252122 A | 12/2011 |
| RU | 2083621 C1 | 7/1997 |
| WO | 9321127 A1 | 10/1993 |
| WO | 9631572 A1 | 10/1996 |
| WO | 200205293 A2 | 1/2002 |
| WO | WO0205293 A2 | 1/2002 |
| WO | 2004022806 A1 | 3/2004 |
| WO | 2005010107 A1 | 2/2005 |
| WO | WO2005010107 A1 | 2/2005 |
| WO | 2005044551 A1 | 5/2005 |
| WO | 2005080465 A1 | 9/2005 |
| WO | 2006007385 A1 | 1/2006 |
| WO | 2006021528 A1 | 3/2006 |
| WO | 2006066825 A1 | 6/2006 |
| WO | 2006079643 A1 | 8/2006 |
| WO | 2008/054413 A2 | 5/2008 |
| WO | 2008/090411 A2 | 7/2008 |
| WO | 2009111049 A1 | 9/2009 |
| WO | WO 2009/111049 A2 | 9/2009 |
| WO | 2009135784 A1 | 11/2009 |
| WO | WO 2011014288 A2 * | 2/2011 .......... C10M 107/32 |
| WO | 2011/051122 A1 | 5/2011 |
| WO | 2013092835 A1 | 6/2013 |

OTHER PUBLICATIONS

English Abstract of JP H01-170670, dated Jul. 5, 1989.
English Abstract of JP 2007-526366, dated Sep. 13, 2007.
English Abstract of JP 2011-252112 (A)—Dec. 15, 2011.
English abstract of DE102006062500 (A1)—Jul. 3, 2008.
English abstract of DE102009037323 (A1)—Feb. 17, 2011.
English abstract of DE102009031266 (A1)—Jan. 13, 2011.
English abstract of DE60319674 (T2)—Apr. 23, 3009.
English abstract of DE4212633 (A1)—Oct. 21, 1993.
English abstract of EP1718690 (A1)—Nov. 8, 2006.
English abstract of EP0387692 (A2)—Sep. 19, 1990.
English abstract of JP 5411938 (A)—Jan. 29, 1979.
English abstract of WO2004022806 (A1)—Mar. 18, 2004.
English abstract of WO2006079643 (A1)—Aug. 3, 2006.
English abstract of WO2005080465 (A1)—Sep. 1, 2005.
English abstract of WO2005044551 (A1)—May 19, 2005.
English abstract of WO2006007385 (A1)—Jan. 19, 2006.
English abstract of WO9321127(A1)—Oct. 28, 1993.
English abstract of WO9631572 (A1)—Oct. 10, 1996.
English abstract of JP62050368 (A)—Mar. 5, 1987.
Maile, Frank J., et al., "Effect Pigments—Past, Present and Future", Progress in Organic Coatings, 2005, pp. 150-163, vol. 54.
Buxbaum, Gunter, et al., "Industrial Inorganic Pigments", 2005, 3rd ed., Wiley-VCH, pp. 243-248.
English Abstract of JP 2011252122 (A)—Dec. 15, 2011.
English Abstract of WO 0205293 (A2)—Jan. 17, 2002.
International Preliminary Report on Patentability dated Jun. 2014.
English abstract of EP1350817 (A1)—Oct. 8, 2003.
English abstract of WO2005010107 (A1)—Feb. 3, 2005.
English Abstract of JP 2006328548.

(56) References Cited

OTHER PUBLICATIONS

English Abstract of JP 2002276665.
English Abstract of JP 04227778.
English Abstract of JP 03205451.
Rejection of Opposition, European Patent Office, dated Oct. 2018.
Müller, B., "Additive kompakt", Hannover, Vincentz Network Verlag, 2009, ISBN: 3-86630-915-5, 35-43.
Müller, B., Lackformulierung und Lackrezeptur—Das Lehrbuch für Ausbildung und Praxis, Hannover, Vincentz Network Verlag, 2005, ISBN: 3-87870-170-5, 41-69.
Colorstream F20-00 WNT Autumn Mystery Product Information, MERCK, 6 pages, circa 2007.
Kittle, H., Lehrbuch der Lacke und Beschichtungen, Band 5, S. Hirzel Verlag Stuttgart-Leipzig 2003, 371-383.
Special Chem, UBE Improve the durability of PU Coatings, Fluorolink® D10 H and Fluorlink® E10 H PFPE: Innovative Additives from Solvay Solexis for Improving the Performance of Polymeric Materials, Aug. 28, 2009, 1 page.
Solvay Solexis, Fluorolink Polymer Modifiers, Product Data Sheets, Dec. 13, 2002, 5 pages.
Partial English machine translation of p. 1 of Rejection of Opposition, European Patent Office, dated Oct. 2018.
Grounds for the Rejection of Opposition, European Patent Office, dated Oct. 2018.
Zhang et al., "Effect of Particle Surface Treatment on the Tribological Performance of Epoxy Based Nanocomposites", Wear 253 (2002) 1086-1093.
Colorstream T20-04 WNT Lapis Sunlight Product Information, MERCK, 6 pages (2007).
English abstract of EP 2 794 769 B1.
Machine translation of JP 2002276665A, dated Apr. 20, 2018.
English Abstract of JP 2002276665A, Sep. 25, 2002.
Technical Data Sheet, 58104 colorstream F20-00 WNT Autumn Mystery, MERCK, 1 page (2003).
Colorstream F20-00 WNT Autumn Mystery Product Information, MERCK, 6 pages.
Huber, J., Zur Natur von γ-Fe2O3, Dissertation, pp. 46 and 51 (2004).
Machine translation of Huber, J., Zur Natur von γ-Fe2O3, Dissertation, pp. 46 and 51 (2004).

\* cited by examiner

PIGMENTED, FINE-STRUCTURED, TRIBOLOGICAL COMPOSITE MATERIAL

This patent application is a U.S. national stage application of PCT international application PCT/EP2012/076343 filed on 20 Dec. 2012 and claims priority of German patent document 10 2011 056 761.5 filed on 21 Dec. 2011, the entirety of which is incorporated herein by reference.

BACKGROUND OF THE INVENTION

Generally accepted practice for reducing friction when two surfaces move relative to one another is to employ greases and oils as lubricants. Such lubrication, known as hydrodynamic lubrication, results in very low coefficients of friction, of well below $\mu=0.05$. Since, under the surface contact stress that occurs, the grease is displaced over time from the area of contact between the two surfaces, and/or may undergo resinification as a result of contamination and oxidation processes, the surfaces in question must be regularly regreased in order to maintain the lubricating effect. This entails increased maintenance effort and an additional cost factor in the case of plants, and also, possibly, component failures in cases where maintenance is not regular. Coatings which diminish sliding friction, consisting of a polymeric binder and solid-state lubricants, may be used as an alternative to this. Significant disadvantages, however, are the generally relatively high coefficients of friction, at levels of $\mu=0.1-0.2$, and the need to balance minimal sliding friction with a controllable abrasion behavior of the layers in association with the formation of the transfer film that is important for lubrication. In the case of corroding substrates, moreover, sufficient corrosion protection must be provided, since the absence of grease means that the hydrophobic protective function in the overall system is lost, and hence electrolytes and oxygen as well may have easy access to the substrate surface. Introduction of abrasion resistance and corrosion protection is accomplished, as a general rule, by using dispersion to incorporate suitable inorganic particles, which in their forms as presently available do fulfill their protective function, but additionally exert a deleterious influence over the lubricating effect of the layer system, so making the resultant compositions of no interest for practical application in the majority of cases.

U.S. Pat. No. 4,694,038 A (Boeing) claims a coating that reduces sliding friction and consists of a polyurethane binder and 20-40 wt % of amorphous graphite particles suitable for equipping the surfaces of elastomers. Using a polyurethane binder allows for effective adhesion to the substrate. A disadvantage, however, is that the graphite particles are distributed uniformly over the thickness of the coating material. Accordingly, while the desired low sliding friction to the outside of the coating is achieved, owing to the capacity for the graphite to be eroded in layers, but at the same time the presence of the graphite in the vicinity of the boundary layer with the substrate causes reduction in the layer adhesion to the substrate material, which can be controlled to some extent only by using correspondingly reactive binders (polyurethanes). Furthermore, as a result of the high level of solid lubricant, the layer systems become relatively soft, and under high surface contact pressures this may easily lead to layer failures as a result of microplowing.

With a similar principle of the uniform distribution of particles over the binder matrix, U.S. Pat. No. 5,789,523 A (DuPont) claims a polyimide composition with incorporated soft phyllosilicates (Mohs hardness 1-5) and carbon fibers, and also, optionally, solid-state lubricants featuring improved sliding friction and improved abrasion resistance, for the purpose of producing injection moldings with built-in tribological effect. The phyllosilicates are said to enhance the durability of the composite materials. At the same time, through the equal distribution of the inorganic adjuvants over the organic polyimide matrix, and through the simultaneously required high levels of adjuvant filling for the purpose of achieving suitable tribological surface properties, there is likewise significant influence over the mechanical and thermal bulk properties of the molding produced, such as the elasticity modulus or the coefficient of thermal expansion, for example, and in certain applications this may be entirely unwanted.

In contrast to the aforementioned references for which the platelet-shaped particles are dispersed only mechanically using shearing forces, WO 2002005293 A2 (EMTEC Magnetic) claims an electrically conductive layer of graphite and a binder, to which a polyurethane dispersion resin is added that carries at least one polar functional group along the main polymer chain that is able to interact with the surface of the platelet-shaped graphite filler and is also in a position to form corresponding graphite intercalation compounds. This type of modification likewise results in equal distribution of the particles over the binder matrix, with a finer particle size distribution, as a general rule, than in the case of purely mechanical dispersing using shearing forces. A morphology of this kind is also desirable in order to achieve high electrical conductivity. Tribological properties, however, are not claimed.

Low-friction coatings of these kinds, comprising solid-state lubricants and polymeric binders, are also frequently equipped, for mechanical reinforcement, with particles of hard material (US 20040229759 A1 (Jet-Lube Inc.)). This principle functions to start with via a simple mixing rule. A problem, however, is that the hard material particles at relatively high concentration generally exert an abrasive effect on the tribological system, as they are transferred onto the opposing body when a transfer film is formed, and may lead to greater wear in the tribological layer in the subsequent friction process. U.S. Pat. No. 4,898,905 A (Taiho Kogyo) likewise claims a lubricant varnish composition comprising polyimide matrix, platelet-shaped, solid-state lubricants, platelet-shaped, silicatic additives, and oil. In this case as well, no particular measure is taken in order to generate a controlled arrangement of particles over the binder matrix, and nor is any such arrangement obtained. The oil that is used introduces into the system a hydrodynamic lubricant component, and by this means, in particular, the initial frictional behavior and the level of the coefficient of sliding friction can be influenced. The fact that the oil may diffuse in the layer and is removed from the system over time is a disadvantage. As a result, the effect is not long-lasting.

U.S. Pat. No. 3,809,442 (3M), EP 1350817 A1 (Ford Motor Comp.), and WO 2005010107 A1 (TNO) claim low-friction coatings comprising combinations of various solid-state lubricants with binders, which are designed for low-temperature applications and coating of temperature-sensitive substrates. WO 2005010107 A1 additionally requires a further, polysiloxane-based, polyolefin wax-based and/or PTFE-based lubricating additive. To develop its activity the additive must not interact with the solid-state lubricants and must be able to diffuse unhindered to the layer/air phase boundary. Any special morphological disposition of the particulate constituents is not critical to the activity of the coating. The additive leads merely to a hydrodynamic component in relation to the lubrication, similar to that described above.

Polymer matrix composites with reinforcing particles are also described for abrasion-resistant antistick coatings.

EP 1718690 claims abrasion-resistant, low-energy layers featuring enhanced alkali resistance. The physical composition comprises a curable organic binder system, at least one functionalized, fluorine-containing polymer or oligomer that is reactive with the binder, and inorganic particles as well.

Owing to the abrasive nature of the particles of hard material, tribological properties cannot be inferred and are also not claimed. Nor is there any description of inorganic, solid-state lubricants.

As a result of the present invention it has been possible to provide a tribologically active layer system which by virtue of its special structure compensates the above-stated disadvantages of conventional low-friction coatings.

It was an object of the present invention to provide a pigmented, fine-structured, tribological composite material which combines a low coefficient of sliding friction with excellent substrate adhesion and with outstanding abrasion and wear resistance, in association with a high barrier function with respect to the diffusion of water vapor, gases, and also corrosive media.

SUMMARY OF INVENTION

This object is achieved by means of the inventions having the features of the independent claims.

Advantageous developments of the inventions are characterized in the dependent claims. The wording of all the claims is hereby made part of the present description, by reference. The inventions also encompass all rational combinations, and more particularly all stated combinations, of dependent and/or independent claims.

The problem has been resolved through the provision of a composition comprising at least one platelet-shaped, solid-state lubricant, at least one type of inorganic, platelet-shaped pigment particles, at least one surface-active compound possessing at least one polar group, and a curable binder system comprising at least one organic polymer or oligomer having one or more functional groups, or a precursor thereof.

The solid-state lubricant consists of platelet-shaped particles. Understood as platelet-shaped is a particle with a ratio of average diameter to thickness of more than 3:1, preferably between 2:1 and 1000:1. All lengths can be measured by TEM.

In one preferred development of the invention, the solid-state lubricant has a thickness of between 50 nm and 1000 nm and an aspect ratio of ≥5, preferably an aspect ratio of from 5 to 20.

The solid-state lubricant particles have a size of from 50 nm to 20 µm, preferably from 700 nm to 5 µm.

This solid-state lubricant may be a customary solid-state lubricant. These may be solid-state lubricants, such as natural graphite, synthetic graphite, graphene, hexagonal boron nitride, turbostratic boron nitride, molybdenum disulfide and/or tungsten disulfide.

Furthermore, purely organic solid-state lubricants may also be added as well, such as perfluoropolymer, polytetrafluoroethylene (PTFE) and/or polyethylene. These lubricants may influence the stick-slip behavior of the cured coating.

A preferred solid-state lubricant is hexagonal boron nitride.

The at least one solid-state lubricant is used preferably in a fraction of 1 to 40 wt %, preferably 20-30 wt %, with the wt % being based on all constituents other than the solvent.

The composition of the invention further comprises at least one type of inorganic, platelet-shaped pigment particles.

The platelets may consist of customary materials. These may be metals, metal oxides, or other inorganic compounds. The platelets may also consist of organic materials. It is important here that the platelets exhibit only little variation with regard to their thickness.

Examples of support materials are mica, glass, silicon dioxide, titanium dioxide, and aluminum oxide.

The pigment particles may also be coated.

The pigment particles have an aspect ratio similar to that described for the solid-state lubricants.

In one preferred development of the invention, the pigment particles have an aspect ratio of ≥10, preferably of between 10:1 and 50:1.

In one preferred development of the invention, the average diameter of the pigment particles is between 1 and 500 µm, preferably between 5 and 200 µm, more preferably between 10 and 150 µm.

There may also be smaller pigment particles used, with a diameter between 1 and 100 µm, preferably between 5 and 60 µm, more preferably between 1 and 15 µm.

The average thickness of the pigment particles is between 0.1 and 5 µm, preferably between 0.5 and 2 µm.

In one particularly preferred development, the pigment particles have an aspect ratio of ≥10, preferably between 10:1 and 50:1, and a thickness of from 0.5 µm to 2 µm.

The at least one type of platelet-shaped pigment particles is used preferably in a fraction of 1 to 40 wt %, preferably 2-10 wt %, with the wt % being based on all constituents other than the solvent.

In one preferred development of the invention, the surface of the pigment particles consists at least partly of a transition metal oxide. Preferably at least the surfaces of the two extensive sides of the pigments consist of a transition metal oxide.

This can be achieved by the entire pigment particle consisting of the transition metal oxide, or by a support material being coated with this transition metal oxide. There may also be a plurality of different transition metal oxides present.

In one preferred development of the invention, the transition metal oxide is selected from the group encompassing $TiO_2$, $ZrO_2$, $ZnO$, and $FeO_x$.

If the pigment particles are coated, the layer of transition metal oxide is between 10 nm and 1000 nm thick, preferably between 50 nm and 300 nm.

The composition further comprises at least one surface-active compound which possesses at least one hydrophobic group and at least one hydrophilic group.

Surface-active compounds are compounds which possess not only a hydrophobic group but also a hydrophilic group. As a result they are in a position to accumulate at interfaces. In the case of a hydrophobic surface, for example, the hydrophobic group of the surface-active compound would interact with this surface and would react with this surface via van-der-Waals forces, for example. As a result of the hydrophilic groups of the surface-active compound, the surface thus occupied also becomes more hydrophilic in this way. In the case of hydrophilic surfaces, the opposite applies.

In the case of the invention, the at least one surface-active compound reacts with the surface of the solid-state lubricant. These solid-state lubricants often tend to be hydrophobic, such as boron nitride or graphite, for example. Through the surface-active compound it is possible to enhance the compatibility of the solid-state lubricant with a hydrophilic environment.

The effect of this modification of the solid-state lubricants and/or of the pigment particles by the surface-active compound is that on exposure to low shearing forces, an intimate sequence of layerlike solid-state lubricant units and inorganic platelets is achieved in the completed polymer composite. Particularly if the pigment particles comprise transition metal oxides, temporary complex bonds may be constructed to the hydrophilic group of the surface-active compound, resulting in the formation, in the interlayers between solid-state lubricant particles and inorganic platelets, of a quasi-transfer film. Ultimately the overall system slides on the multiplicity of quasi-transfer films which come to lie one above another in the vertical direction with respect to the layer surface.

The surface-active compound has at least one hydrophilic group. Such a group may be, for example, a hydroxyl group, ether group, ester group, carboxylic acid, amino, ammonium, guanidinium, imidazolium, pyridinium, pyrrolidinium, phosphonium, or sulfonium group.

The surface-active compound also has at least one hydrophobic group. These may be substituted or unsubstituted, branched or unbranched alkyl groups, preferably having 4 to 30 carbon atoms. They may also contain double bonds. The compounds in question may also be polyether compounds and polysiloxanes, which may likewise be substituted.

The hydrophobic group may also have aromatic radicals which are able to interact with the surface of the solid-state lubricant.

The surface-active compound may also be a polymer or oligomer which possesses the stated groups.

The surface-active compound may react with the binder system either via the hydrophilic or hydrophobic groups already present or via at least one further type of groups, and so may be integrated into the polymer matrix.

In one preferred development, the surface-active compound is selected from the group encompassing ammonioalkyl, phosphonioalkyl, sulfonioalkyl, imidazolioalkyl, pyridinioalkyl, and pyrrolidinium compounds, ionic liquids, functionalized, fluorine-containing polymers, polyethers, and functionalized polysiloxanes.

The fluorine-containing polymers comprise at least one fluorine-containing polymer or oligomer having at least one hydrophilic group. The compounds in question are preferably oligomers, more particularly functional, short-chain fluorooligomers, in which the functional group is preferably a carboxyl group and more preferably a hydroxyl group.

Suitable polymers or oligomers are all those which contain fluorine and have at least one hydrophilic group. The hydrophilic group may also be utilized for attachment to the binder system.

Useful here are fluorinated polyethers, more particularly perfluoropolyethers. Other examples are fluorinated epoxides and fluorinated polyurethanes. One example of a monomer suitable for the introduction of fluorine atoms into epoxy or polyurethane resin systems is the diglycidyl ether of 1,3,5-fluoroalkylbenzene.

It is possible, furthermore, to use copolymers where one kind of monomer is fluorine-containing—examples are customary fluoromonomers, such as tetrafluoroethylene, perfluoropropylene, tri fluorochloroethylene, vinylidene fluoride, and hexafluoropropylene—and one kind of monomer is copolymerizable therewith and comprises a functional group, such as, for example, vinyl compounds which possess a functional group, such as vinyl ethers, vinyl esters, vinyl alcohols, vinyl acetates, and vinylamines which have or are substituted by a functional group. One example is a fluoroethylene-alkyl vinyl ether copolymer in which the alkyl group (e.g., linear or branched $C_1$-$C_8$ alkyl, such as methyl, ethyl, n-propyl, isopropyl, or n-, sec-, or tert-butyl) is substituted by a suitable functional group, such as OH, COOH, or oxyalkylol ($[-O-(CH_2)_n]_x-OH$, in which n is identical or different and is 1 to 8, and x is 1 to 3), for example. The fluoroethylene may be tetrafluoroethylene or trifluorochloroethylene, for example. In the copolymer there may be one alkyl vinyl ether or different alkyl vinyl ethers, as for example those with a functional group and those without a functional group. It is also possible for copolymers of tetrafluoroethylene and perfluoroalkyl vinyl ethers to be employed.

Via the copolymerization it is also possible to introduce sulfonic acid or phosphonic acid groups, such as by copolymerization of tetrafluoroethylene with trifluorovinyl sulfochloride or perfluoro vinyl ether sulfofluorides. Polytetrafluoroethylene can also be functionalized by graft polymerization with abovementioned vinyl compounds or acrylic acids.

Such fluorine-containing polymers or oligomers with functional groups are available commercially, examples being Lumiflon® from Asahi Glass Co. Ltd. or Fluorolink® from Solvay Solexis. Preferred fluorine-containing polymers or oligomers with at least one functional group are fluorinated polyethers, preferably perfluoropolyethers, and fluoroethylene-alkyl vinyl ether copolymers, where the fluoroethylene is preferably tetrafluoroethylene and/or trifluoromono-chloroethylene.

The fluorine-containing polymer or oligomer may have one or more functional groups. Suitable functional groups are, in principle, hydroxyl, amino, carboxyl, and acid anhydride groups, epoxide, isocyanate, and acyl chloride groups, and nitrile, isonitrile, and SH groups. Also suitable, moreover, are $-SO_2H$ groups and $-PO_3H$ groups. Preferred groups are amino, hydroxyl, and carboxyl, with carboxyl and especially hydroxyl groups being preferred.

Polysiloxanes are synthetic polymeric compounds in which silicon atoms are linked in chainlike and/or netlike manner via oxygen atoms, and the remaining valences of the silicon are satisfied by hydrocarbon radicals (usually methyl, less often ethyl, propyl, phenyl groups, etc.). On the basis of the organic radicals, such compounds are also referred to as polyorganosiloxanes. A preferred compound are polyorganosiloxanes terminated with hydrophilic groups. Suitable such groups include in principle hydroxyl, amino, carboxyl and acid anhydride groups, epoxide and isocyanate groups, acyl chloride groups, and nitrile, isonitrile, and SH groups. Also suitable are $-SO_2H$ groups and $-PO_3H$ groups, furthermore. Preference is given to amino, hydroxyl, and carboxyl groups, with carboxyl and especially hydroxyl groups being preferred.

Preferred polyorganosiloxanes are polydimethyl-siloxanes, polyphenylmethylsiloxanes, or polydialkoxy-dimethylsiloxanes.

Further preferred compounds are polyether compounds, which may likewise be terminated with the stated groups. These are polymers or oligomers which contain ether groups. Generally speaking they consist of linear or branched $C_2$-$C_8$ units which are joined to one another via oxygen atoms. Preferably each unit is joined to the other unit via exactly two oxygen atoms, thus forming a linear chain. Examples of such units are ethylene, n-propylene, isopropylene, butylene, isobutylene, pentylene, isopentylene, hexylene, isohexylene, heptylene, and isoheptylene. The individual units may also carry further functional groups or be substituted, by chlorine or fluorine atoms, for example.

A polyether compound may also comprise a plurality of different units, as in the case of a block polymer, for example.

Preferred polyether compounds are polyether compounds having ethylene (PEG), propylene and/or isopropylene units (PPG). Preferred compounds are polyoxyethylene-polyoxypropylene block polymers (CAS No. 9003-11-6) with the following structure:

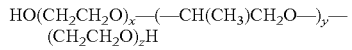

where x, y, and z are integers from the range from 2 to 130, more particularly from 15 to 100, and x and z are the same, but are selected independently of y.

The molecular weight of the surface-active compounds may vary within wide ranges. Where oligomers are employed, a useful molecular weight (weight average) may frequently be, for example, in the region of at least 100, more usefully at least 500 or preferably at least 600, and, independently thereof, up to 5000, more usefully up to 3000, and preferably up to 1500 or up to 1000.

In the case of polyorganosiloxanes, these are compounds having 3 to 20 siloxane units, preferably 5 to 10 siloxane units. Generally speaking, a mixture of two or more polyorganosiloxanes with different lengths is employed.

The at least surface-active compound is used preferably in a fraction of 0.2 to 15 wt %, preferably 5-10 wt %, the wt % being based on all constituents other than the solvent.

The composition further comprises as curable binder system a curable binder system comprising at least one organic polymer or oligomer having one or more functional groups, or a precursor thereof. This may be the customary binder systems used for coating compositions or for molding compounds. The binder systems comprise more particularly the customary organic resins. The binder systems may be physically or, preferably, chemically curing systems. They may be oxidatively curing, cold-curing, thermally curing, or radiation-curing systems. They may be one- or two-component coating materials. Preferably they are chemically curing or crosslinkable binder systems. Curable binder systems of these kinds are familiar to the skilled person.

The binder systems or coating materials that can be employed, or the polymers or oligomers or precursors thereof that are used for them, comprise, for example, the customary binder systems known from the prior art, as are described in, for example, Ullmanns, Encyklopädie der technischen Chemie, vol. 15, 4th edn., 1978, p. 589 ff. More particularly they are organic polymers, oligomers, or precursors thereof. By the precursors of the polymers or oligomers are meant the monomers or low molecular mass polymerization products, condensation products, or adducts that are formed from them, and from which the polymers or oligomers are derived.

Examples of binder systems or coating materials, and of the organic polymers or oligomers used for them, are oil varnishes which comprise oils, such as linseed oil, tung oil, or soybean oil, for example, and which may have been modified with polybutadiene oils; nitrocellulose lacquers, which comprise nitrocelluloses; varnishes comprising cellulose esters of organic acids, such as esters of cellulose with acetic acid or butyric acid, or the anhydrides thereof, with cellulose acetobutyrates, for example, also finding use in polyurethane varnishes; chlorinated rubber varnishes, comprising chlorinated polyisoprene, polypropylene, or polyethylene, for example; coating materials comprising polyvinyl compounds and/or polyvinyl resins, such as polyolefins, e.g., polyethylene, ethylene-vinyl acetate copolymers, and ethylene-maleic acid (anhydride) copolymers, PVC, polyvinylidene chloride, polyvinyl alcohol, polyvinyl acetals, e.g., polyvinyl butyral, polyvinyl ethers, e.g., methyl or ethyl ethers, polyvinyl esters, e.g., polyvinyl acetate (PVA) and polyethylene terephthalate, polyvinylpyrrolidone, polystyrene, styrene-acrylonitrile copolymers (SAN), acrylonitrile-butadiene-styrene copolymers (ABS), styrene-maleic ester copolymers, styrene-butadiene copolymers, and styrene-maleic anhydride copolymers; coating materials based on acrylic resins, such as polyacrylic acid, polymethacrylic acid, polyacrylamide, acrylic esters or methacrylic esters, e.g., polymethyl (meth)acrylate; alkyd resins which comprise dibasic acids or anhydrides, such as phthalic acid and phthalic anhydride, and polyols or condensation products thereof that have been oil-modified or fatty acid-modified; saturated polyester resin coating materials, comprising saturated polyesters of saturated monomers having two or more functional groups (OH and/or COOH groups); polyurethane varnishes, used frequently as two-component systems, comprising blocked or nonblocked polyisocyanates and polyhydroxyl compounds; epoxy resin coating materials, such as bisphenol A resins, bisphenol F resins, aliphatic and heterocyclic epoxy resins, or thermoplastic film-forming epoxy resins; silicone resin coating materials; urea, melamine, phenoxy, and phenolic resin coating materials; and also polyesters, polyarylates, polyamides, polyethers, polyimides, polyamideimides, polybenzimidazoles, polyurea, and polycarbonates. Combinations of these coating materials, varnishes, or polymers may also be used. It is always also possible to use the precursors, such as the monomers, for example, of the stated polymers or oligomers.

Preferred binder systems are polyurethane resin varnishes and polyepoxy resin varnishes. Likewise preferred, furthermore, are polyamides, polyimides, polyamideimides, or polybenzimidazoles, or precursors thereof, particularly since in this way it is possible to obtain particularly high-temperature-stable systems, preference being given to those which contain aromatic groups. On the basis of their planar construction and their delocalized π-electron system, the aromatic groups are able to interact with the platelets of the solid-state lubricant and therefore particularly advantageous for the tribological properties of the composite, since they promote its fine distribution via the matrix and the formation of transfer films.

The binder comprises an organic polymer or oligomer or a precursor thereof having one or more functional groups. Examples of useful functional groups are C—C double bonds, hydroxyl, amino, carboxyl, acid anhydride, epoxide and/or isocyanate groups. Further examples are acyl chloride groups, and nitrile, isonitrile, and SH groups.

It will be appreciated that the functional groups are selected such that the desired curing reactions are able to take place. There may be only one functional group present, which is reactive with itself, or two or more groups, which are reactive with one another. The groups may be present on the same or on different polymers, oligomers, or precursors thereof, or a group may be introduced by way of a curing agent or crosslinking. The interrelationships are known to the skilled person. The binder system also comprises the curing agents or crosslinkers, where used. Preferably it is one of these functional groups which is reactive with a functional group of the fluorine-containing polymer or oligomer. It may, however, also be a functional group which is independent thereof and is reactive only with the functional group of the fluorine-containing polymer or oligomer.

Organic polymers or oligomers or precursors thereof, such as monomers, that are employed with preference are polyepoxides, polyols, nonblocked or, in particular, blocked polyisocyanates, polyesters, polyamines, polycarboxylic acids, or polycarboxylic anhydrides, each containing two or more functional groups. The expression "poly" here relates to the functional group and not to the degree of polymerization. Accordingly, the polyols possess two or more hydroxyl groups and the compound in question may be a monomer, oligomer, or polymer (e.g. a polyurethane). Specific components are illustrated in example form below, with preferred binder systems.

Polyisocyanates are used, for example, for polyurethane resins. The polyisocyanate may have two or more isocyanate groups. It may for example be aliphatic, alicyclic, aromatic or heterocyclic, monocyclic, or polycyclic.

Customary polyisocyanates may be used, examples being monomeric polyisocyanates, polyisocyanate adducts, so-called modified polyisocyanates, or mixtures of these. They are known to the skilled person and available commercially and are described in, for example, G. Oertel, Polyurethane Handbook, Hanser-Verlag 1993 and in "Methoden der organischen Chemie" (Houben-Weyl), vol. 14/2, Thieme Verlag, 1963. The adducts may have, for example, an average NCO functionality of 2 to 6, preferably 2.4 to 4.

The polyisocyanate adducts are, for example, adducts which find use typically as curing agents for two-component urethane varnishes and are described in "Lackharze: Chemie, Eigenschaften and Anwendungen", edited by D. Stoye and W. Freitag, Hanser Verlag Munich, Vienna, 1996.

Examples of suitable polyisocyanates are the diisocyanates known from polyurethane chemistry, such as, for example, 1,3-diisocyanatobenzene, tolylene 2,4- and 2,6-diisocyanate (TDI), hexamethylene 1,6-diisocyanate (HMDI), diphenylmethane 4,4'- and 2,4-diisocyanate (MDI), naphthylene diisocyanate, xylylene diisocyanate, isophorone diisocyanate, paraphenyl diisocyanate, dicyclohexylmethane diisocyanate, cyclohexyl diisocyanate, polymethylpolyphenyl isocyanate, dodecamethylene 1,6-diisocyanate, 1,4-bis(isocyanato-cyclohexyl) methane, pentamethylene diisocyanate, trimethylene diisocyanate, triphenylmethane diisocyanate, and also the higher molecular mass polyisocyanates that are derived from these diisocyanates and are based, for example, on isocyanurate, uretdione, allophanate, and biuret. The isocyanates are available, for example, under the trade names Desmodur® and Baymidur® (from Bayer), CARADATE® (from Shell), TEDIMON® (from Enichem), and LUPRANAT® (from BASF). Examples of monomeric polyisocyanates having more than two isocyanate groups are, for example, 4-isocyanatomethyloctane 1,8-diisocyanate, and aromatic polyisocyanates such as triphenylmethane 4,4',4''-triisocyanate or polyphenylpolymethylene polyisocyanates.

The polyisocyanate may be used in blocked form, in order to prevent an uncontrolledly rapid reaction, and may become reactive only after deblocking, by means of heating, for example. The blocking of isocyanates is a method known to the skilled person for reversibly reducing the reactivity of isocyanates. Contemplated for the blocking of the isocyanates are all common blocking agents, such as, for example, acetone oxime, cyclohexanone oxime, methyl ethyl ketoxime, acetophenone oxime, benzophenone oxime, 3,5-dimethylpyrazole, 1,2,4-triazole, ethyl malonate, ethyl acetoacetate, ε-caprolactam, phenol, or ethanol.

As a polyol component it is possible for pure di-, tri-, or polyalcohols to be used, such as ethylene glycol and trimethylolpropane, for example, or for partially hydrolyzed fatty acid glycerides to be used. These, however, are commonly used only as a starting basis for polyhydroxyl compounds with higher molecular mass. They may, for example, be more or less branched polyester polyols (Desmophen® products) formed with dicarboxylic acids, or polyether polyols (Desmophen U® products) formed by addition reaction with epoxides. Other examples are hydroxy-functional acrylic resins (Desmophen A® products).

From the polyisocyanates and the polyols, polyurethane resin varnishes can be formed. Of course, especially in the case of nonblocked polyisocyanates, it may be necessary not to mix the components with one another until shortly before use. Polyisocyanates may also be reacted with compounds having other functional groups which contain active hydrogen. Examples of these groups are thiol groups (—SH), primary or secondary amino groups (—NHR', in which R' may for example be H, alkyl, cycloalkyl, aryl, and corresponding aralkyl and alkaryl groups), or carboxyl groups (—COOH). Reaction products formed in the course of the reaction with isocyanates include urethanes (in the case of hydroxyl and carboxyl), thiourethanes (in the case of thiol), or ureas (in the case of amine).

Examples of polyepoxides are bisphenol A resins (e.g., condensation products of bisphenol A and epichlorohydrin), bisphenol F resins (e.g., condensation products of bisphenol F and epichlorohydrin), aliphatic epoxy resins (e.g., low-viscosity glycidyl ethers), cycloaliphatic epoxy resins and heterocyclic epoxy resins (e.g., triglycidyl isocyanurate), or thermoplastic epoxy resin varnishes. For film formation, polyepoxy resins are frequently admixed with curing agents, in order to achieve crosslinking. Curing agents contemplated are organic or inorganic compounds having reactive hydrogen that are able to react with epoxide groups or hydroxyl groups. Examples of curing agents used are polyamines, polyaminoamide resins, polyisocyanates, hydroxyl-containing synthetic resins, such as urea resins, melamine resins, phenoxy resins, and phenolic resins, fatty acids, and organic acids with reactive double bonds, such as acrylic acid or methacrylic acid. Where the last-mentioned curing agents are employed, crosslinking may also take place by means of electron beams.

Polyamides are condensation products of di-, tri-, or tetraamines and di- or tetracarboxylic acids or derivatives thereof; aliphatic and/or aromatic compounds may be used. Polyamides with aromatic units are of interest more particularly for interaction with the solid-state lubricants. Polyimides as well, examples being polycondensates of aromatic diamines, such as benzidine, 4,4-diaminodiphenyl ether, or 4,4'-bis(3-aminophenoxy)diphenyl sulfone, and aromatic tetracarboxylic acids or their derivatives, such as 4,4'-benzophenonetetracarboxylic dianhydride or pyromellitic dianhydride, and polybenzimidazoles, which represent condensation products of aromatic tetramines and dicarboxylic acids or their derivatives, are particularly preferred. For the stated plastics in the composition of the invention it is possible to use the corresponding monomers or low molecular mass condensation products.

The binder system is used preferably in a fraction of 40 to 80 wt %, preferably 40-60 wt %, with the wt % being based on all constituents other than the solvent.

In one development of the invention, the composition comprises inorganic particles. For the particles, suitability is possessed by virtually all ceramic and glass systems, but also, optionally, metals, semiconductors, and customary fillers. The particles in question are preferably ceramic particles. Frequently used are oxides, nitrides, carbides, carbonitrides, silicides, or borides. Mixtures of different particles may also be used. Preference is given to using abrasive particles or hard materials, more preferably low-abrasivity particles having a universal hardness of between 1000 MPa and 3500 MPa. The particles may be surface-modified or unmodified.

The particles are, for example, particles of metal, including metal alloys, semimetal (e.g., B, Si, and Ge) compounds or metal compounds, more particularly metal chalcogenides, very preferably the oxides and sulfides, nitrides, carbides, silicides, and borides. One kind of particle or a mixture may be used.

Examples are (optionally hydrated) oxides such as ZnO, CdO, $SiO_2$, $GeO_2$, $TiO_2$, $ZrO_2$, $CeO_2$, $SnO_2$, $Al_2O_3$ (e.g., amperite, boehmite, AlO(OH), including in the form of aluminum hydroxide), $B_2O_3$, $I_2O_3$, $La_2O_3$, $Fe_2O_3$ (e.g., hematite), $Fe_3O_4$, $Cu_2O$, $Ta_2O_5$, $Nb_2O_5$, $V_2O_5$, $MoO_3$ or $WO_3$; other chalcogenides, such as sulfides (e.g., CdS, ZnS, PbS, and $Ag_2S$), selenides (e.g., GaSe, CdSe, and ZnSe), and tellurides (e.g., ZnTe or CdTe); halides, such as AgCl, AgBr, AgI, CuCl, CuBr, $CdI_2$, and $PbI_2$; carbides such as $CdC_2$, $B_4C$, or SiC; arsenides, such as AlAs, GaAs, and GeAs; antimonides such as InSb; nitrides, such as $Si_3N_4$ and $Ti_3N_4$; phosphides such as GaP, InP, $Zn_3P_2$, and $Cd_3P_2$; phosphates, silicates, zirconates, aluminates, stannates, and the corresponding mixed oxides (e.g., indium-tin oxide (ITO), antimony-tin oxide (ATO), fluorine-doped tin oxide (PTO), luminescent pigments with Y- or Eu-containing compounds, spinels, ferrites, or mixed oxides with perovskite structure such as $BaTiO_3$ and $PbTiO_3$).

Hard powders are used preferably for the particles. Examples of hard powders are powders of diamond, garnet, pumice, tripel, silicon carbide, emery, aluminum oxides, such as amperite and corundum, silicon oxides, such as kieselguhr, quartz or abrasive sands, gypsum, boron carbide, and other oxides, borides, silicides, carbides, carbonitrides, and nitrides.

The inorganic particles consist preferably of $Si_3N_4$, SiC, $B_4C$, $Al_2O_3$ and/or $SiO_2$.

There is no particular restriction on the size of the particles. The average particle diameter is situated usefully, for example, in the range from at least 5 nm, more preferably at least 10 nm, to not more than 100 μm, more preferably not more than 50 μm, and very preferably not more than 20 μm or 10 μm. Mixtures of particles of different sizes may also be used. For example, SiC UF-10 can be used with coarser UF-05 and finer UF-15 in combination.

In one preferred development, the average particle size is between 0.1 and 3 μm.

The average particle diameter relates to the numerical average ascertained. The particle sizes were determined by means of scanning electron microscopy.

The inorganic particles are used preferably in a fraction of 1 to 15 wt %, preferably 2-10 wt %, with the wt % being based on all constituents other than the solvent.

In one development of the invention, the inorganic particles have a hardness of 1000 MPa to 3500 MPa, preferably between 1200 MPa and 2000 MPa, measured as universal hardness (HU).

It may be necessary here for the hardness of the inorganic particles to be tailored mandatorily to that of the other components, especially the pigment particles. In this way it is possible to improve the durability of the cured coating, since the inorganic particles are unable to exert any abrasive effect on the pigment particles.

The inorganic particles insert themselves into the interlayers in the resultant composite material, and provide support additionally for the overall structure, in order thereby to prevent microplowing of the opposing body. In order to fulfill this function optimally, the particles of hard material must not be abrasive to the inorganic platelets and should be selected suitably in terms of hardness.

As a result of the fine structuring of the layered materials in the sense described, composite materials with additionally high barrier function are obtained that afford protective protection from corrosive attack to the substrate. Moreover, as a result of their interaction with the inorganic pigment particles and/or, optionally, inorganic particles, the surface-active compounds tend to adopt an orientation to the hydrophobic air side, thereby achieving the tribological functions at the layer surface, and at the same time the layers exhibit effective adhesion to the substrate, as necessary support for good corrosion protection, on account of the accumulation of reactive matrix constituents in the direction of the substrate.

The inorganic solid-state lubricants are then arranged in layer format between the pigment platelets.

The composition customarily comprises at least one solvent, in which the constituents are present in solution or suspension.

As solvent (dispersant) it is possible to use, for example, solvents customary for coatings. One suitable solvent is water. Suitable organic solvents include both polar and apolar and aprotic solvents. Examples thereof are alcohols, preferably lower aliphatic alcohols ($C_1$-$C_8$ alcohols), such as methanol, ethanol, 1-propanol, isopropanol, and 1-butanol, ketones, preferably aliphatic ketones, such as acetone, methyl ketone, and methyl isobutyl ketone, esters, such as 2-methoxypropyl acetate, butyl acetate, and ethyl acetate, ethers, preferably lower dialkyl ethers, such as diethyl ether, cyclic ethers, such as dioxane or THF, or monoethers of diols, such as ethylene glycol or propylene glycol, with $C_1$-$C_8$ alcohols, aromatic or aliphatic hydrocarbons, such as hexane, heptane, petroleum ether, toluene, and xylene, amides, such as dimethylformamide, and mixtures thereof. If using blocked isocyanates, protic solvents ought to possess a boiling point below the deblocking temperature of the blocked isocyanate, in order to minimize side-reactions. Examples are aliphatic alcohols having 1 to 4 carbon atoms. Also suitable are high-boiling solvents such as methyl-2-pyrrolidone (NMP) or γ-butyrolactone (GBL).

Solvents and/or mixtures of different solvents are customarily added up to solids contents in the composition of between 10 and 70 wt %, preferably between 20 wt % and 50 wt %. The ultimate amount is guided by factors including the later method of application.

In one preferred development of the invention, the composition comprises the following constituents:
  1-40 wt % of at least one platelet-shaped, solid-state lubricant;
  0.2-15 wt % of surface-active compound;
  29-97.8 wt % of curable binder system;
  1-40 wt % of inorganic, platelet-shaped pigment particles;
  0-15 wt % of inorganic particles.

The composition may also comprise further additives in the 0-5 wt % range. The wt % figures are based on the stated constituents minus the solvent of the composition, and add up in total to 100 wt %.

In one preferred development of the invention, the composition comprises the following constituents:
  20-30 wt % of at least one platelet-shaped, solid-state lubricant;

5-10 wt % of surface-active compound;
40-71 wt % of curable binder system;
2-10 wt % of inorganic, platelet-shaped pigment particles;
2-10 wt % of inorganic particles.

The composition may also comprise further additives in the 0-5 wt % range. The wt % figures are based on the stated constituents minus the solvent of the composition, and add up in total to 100 wt %.

The invention further relates to a method for producing a tribological composite material.

Individual steps of the method are described in more detail below. The steps need not necessarily be carried out in the order stated, and the method to be outlined may also have further, unspecified steps.

In a first step, the composition is applied to a substrate. This may be done in any customary way. All common coating techniques may be employed. Examples are spin coating, (electro) dip coating, knife coating, spraying, injecting, pouring, spreading, flow coating, blade coating, slot coating, meniscus coating, curtain coating, and roller application.

Any customary materials may be coated. Examples of suitable substrates are substrates made of metal, semiconductors, glass, ceramic, including porous ceramics, glass-ceramic, plastic, wood, paper, building materials, or inorganic-organic composite materials. The substrates may have been pretreated, by a corona treatment, for example, or with a preliminary coating, such as a paint coating (paint surfaces), enameling, a coating system, or a metalized surface, or by impregnation.

Examples of metal substrates include, for example, copper, aluminum, brass, iron, steel, and zinc. Examples of semiconductors are silicon, in wafer form, for example, and indium-tin oxide layers (ITO layers) on glass. The glass used may be any conventional types of glass, examples being silica glass, borosilicate glass, or soda-lime silicate glass. Examples of plastics substrates are polycarbonate, polymethyl methacrylate, polyacrylates, polyethylene terephthalate, polyamide, polyetherketone (PEK), polyetheretherketone (PEEK), or polyoxymethylene. Especially for optical or optoelectronic applications, transparent substrates are suitable, composed of glass or plastic, for example. Examples of building materials are blocks, concrete, tiles, plasterboard, or brick.

This is followed by curing. Since the curing, by its nature, depends essentially on the binder systems employed, it is impossible to make specific statements. The skilled person is aware of which curing conditions are appropriate for the particular known binder systems. As stated, these may be oxidatively curing, cold-curing, thermally curable or radiation-curable systems.

Depending on the particle size of the particles added, the properties may be modified within different ranges. Where particles in the μm range are utilized, and the refractive index of the matrix is not adapted to the particles, the layers obtained are opaque to translucent. Through the choice of the starting components, especially the matrix material and the proportion of aromatic (highly refractive) components and aliphatic components, however, the refractive index can be adapted to different powders employed, with average particle diameters in the μm range. A part is also played here by the refractive index of the powders, for which a relatively wide selection is available, starting with $SiO_2$, with very low refractive indices, through aluminum oxide, silicon carbide, and zirconium dioxide, with higher refractive indices.

In one preferred development of the method, the composition is produced by first preparing a mixture of at least one platelet-shaped, solid-state lubricant and a surface-active compound in a solvent suitable for crosslinkable polymers. At this stage, the at least one solid-state lubricant is surface-modified with the surface-active compound.

Only in a subsequent step are the curable binder system and the at least one type of inorganic, platelet-shaped pigment particles added. In this step, optionally, the inorganic particles are added as well. The curable binder system may also have been dissolved in one or more solvents. The pigment particles too may be added in the form of a suspension.

Further details and features will emerge from the subsequent description of preferred working examples in conjunction with the dependent claims. In this context, the respective features may be actualized alone or in plural in combination with one another. The possibilities for achieving the object are not confined to the working examples. Thus, for example, range indications always include all unstated intermediate values and all conceivable subintervals.

DETAILED DESCRIPTION OF INVENTION

Figure 1:
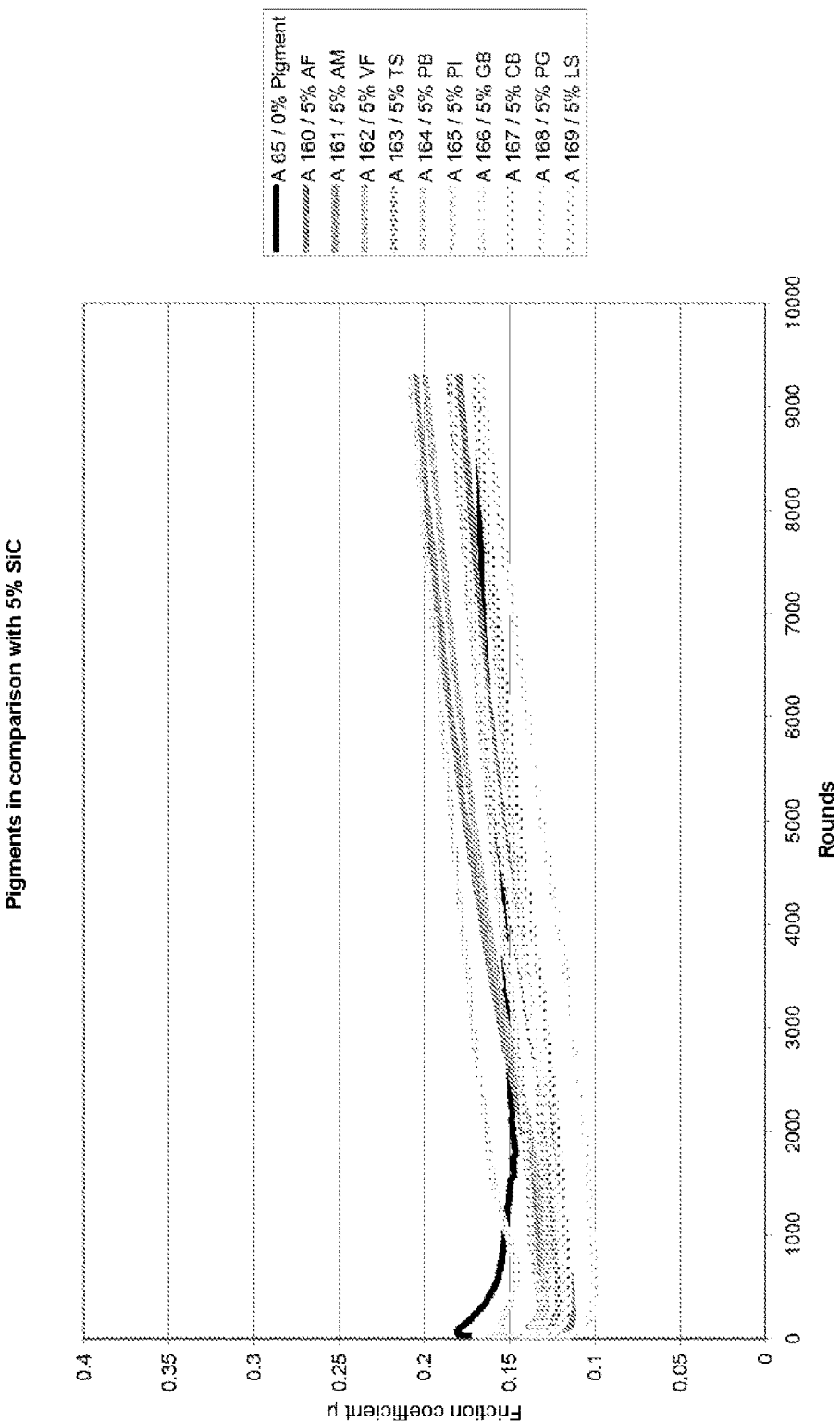
FIG. 1 comparison of different pigment particles in terms of their influence on the friction coefficient μ for a pigment concentration of 5 wt % (BN 110: 30 wt %, SiC: 5 wt %; A 65: comparative sample without pigment.

It is possible for numerous modifications and developments of the working examples described to be actualized.

Working Examples

General Synthesis Procedure:

In a Dispermat, 10-40% of the solvent used, glass dispersing beads, the solid lubricant and the surface-active compound having at least one hydrophilic and at least one hydrophobic group are dispersed at 50° C. and 2000 rpm. After 15 minutes the matrix components and, optionally, the hard material particles are added, and dispersion is continued for 90 minutes more at 50° C. and 2000 rpm. The glass beads are removed from the crude product by filtration. Subsequent dispersing of the pigment particles in the overall mixture is done using a dissolver disk over 30 minutes at 25° C. and 1000 rpm.

Application:

The reactive mixture obtained can be applied by application methods customary in the art, such as dip application or spray application, for example. Curing takes place at 150° C.-250° C. for 1 h-2 h.

Inventive Compositions

Example 1: Base System without Hard Material (A200)

5.94 g of boron nitride BN 110 (Henze) are mixed with 35 ml of N-methyl-2-pyrrolidone (NMP) and 1.98 g of Fluorolink D10H (Solvay) in a Dispermat at 50° C. and 2000 rpm over 15 minutes. Then 3.37 g of pyromellitic dianhydride (PMDA) and 7.51 g of bis[4-(3-aminophenoxy)phenyl]sulfone (BAPPS) are added, followed by dispersion for 90 minutes more at 50° C. and 2000 rpm. Following removal of the glass beads, 0.99 g of Lapis Sunlight T20-04-WNT (Merck) is added, and the resulting overall mixture is mixed using a dissolver disk for 30 minutes at 25° C. and 1000 rpm. A homogeneous, liquid reactive mixture is obtained, which has a pale brownish coloring.

Example 2: Analogous to Example 1 with 1.25% SiC (A201)

6.08 g of boron nitride BN 110 (Henze) are mixed with 35 ml of NMP and 2.03 g of Fluorolink D10H (Solvay) in a Dispermat at 50° C. and 2000 rpm over 15 minutes. Then 3.37 g of PMDA, 7.51 g of BAPPS, and 0.25 g of SiC UF10 (HC Starck) are added, followed by dispersion for 90 minutes more at 50° C. and 2000 rpm. Following removal of the glass beads, 1.01 g of Lapis Sunlight T20-04-WNT (Merck) are added, and the resulting overall mixture is mixed using a dissolver disk for 30 minutes at 25° C. and 1000 rpm. A homogeneous, liquid reactive mixture is obtained, which has a pale brownish coloring.

Example 3: Analogous to Example 1 with 2.5% SiC (A202)

6.22 g of boron nitride BN 110 (Henze) are mixed with 35 ml of NMP and 2.07 g of Fluorolink D10H (Solvay) in a Dispermat at 50° C. and 2000 rpm over 15 minutes. Then 3.37 g of PMDA, 7.51 g of BAPPS, and 0.52 g of SiC UF10 (HC Starck) are added, followed by dispersion for 90 minutes more at 50° C. and 2000 rpm. Following removal of the glass beads, 1.04 g of Lapis Sunlight T20-04-WNT (Merck) are added, and the resulting overall mixture is mixed using a dissolver disk for 30 minutes at 25° C. and 1000 rpm. A homogeneous, liquid reactive mixture is obtained, which has a pale brownish coloring.

Example 4: Analogous to Example 1 with 5% SiC (A169/A193)

6.53 g of boron nitride BN 110 (Henze) are mixed with 35 ml of NMP and 2.18 g of Fluorolink D10H (Solvay) in a Dispermat at 50° C. and 2000 rpm over 15 minutes. Then 3.37 g of PMDA, 7.51 g of BAPPS, and 1.09 g of SiC UF10 (HC Starck) are added, followed by dispersion for 90 minutes more at 50° C. and 2000 rpm. Following removal of the glass beads, 1.09 g of Lapis Sunlight T20-04-WNT (Merck) are added, and the resulting overall mixture is mixed using a dissolver disk for 30 minutes at 25° C. and 1000 rpm. A homogeneous, liquid reactive mixture is obtained, which has a pale brownish coloring.

Example 5: Analogous to Example 1 with 10% SiC (A204)

7.26 g of boron nitride BN 110 (Henze) are mixed with 35 ml of NMP and 2.42 g of Fluorolink D10H (Solvay) in a Dispermat at 50° C. and 2000 rpm over 15 minutes. Then 3.37 g of PMDA, 7.51 g of BAPPS, and 2.42 g of SiC UF10 (HC Starck) are added, followed by dispersion for 90 minutes more at 50° C. and 2000 rpm. Following removal of the glass beads, 1.21 g of Lapis Sunlight T20-04-WNT (Merck) are added, and the resulting overall mixture is mixed using a dissolver disk for 30 minutes at 25° C. and 1000 rpm. A homogeneous, liquid reactive mixture is obtained, which has a pale brownish coloring.

Example 6: Analogous to Example 1 with 15% SiC (A205)

8.16 g of boron nitride BN 110 (Henze) are mixed with 35 ml of NMP and 2.72 g of Fluorolink D10H (Solvay) in a Dispermat at 50° C. and 2000 rpm over 15 minutes. Then 3.37 g of PMDA, 7.51 g of BAPPS, and 4.08 g of SiC UF10 (HC Starck) are added, followed by dispersion for 90 minutes more at 50° C. and 2000 rpm. Following removal of the glass beads, 1.36 g of Lapis Sunlight T20-04-WNT (Merck) are added, and the resulting overall mixture is mixed using a dissolver disk for 30 minutes at 25° C. and 1000 rpm. A homogeneous, liquid reactive mixture is obtained, which has a pale brownish coloring.

Example 7: Analogous to Example 1 with 20% SiC (A206)

9.33 g of boron nitride BN 110 (Henze) are mixed with 35 ml of NMP and 3.11 g of Fluorolink D10H (Solvay) in a Dispermat at 50° C. and 2000 rpm over 15 minutes. Then 3.37 g of PMDA, 7.51 g of BAPPS, and 6.22 g of SiC UF10 (HC Starck) are added, followed by dispersion for 90 minutes more at 50° C. and 2000 rpm. Following removal of the glass beads, 1.55 g of Lapis Sunlight T20-04-WNT (Merck) are added, and the resulting overall mixture is mixed using a dissolver disk for 30 minutes at 25° C. and

Example 8: Analogous to Example 2 with 1.25% Si$_3$N$_4$ E05 (A233)

6.08 g boron nitride BN 110 (Henze), 35 ml NMP, 2.03 g Fluorolink D10H (Solvay), 3.37 g PMDA, 7.51 g BAPPS, 0.25 g Si$_3$N$_4$ E05 (UBE), 1.01 g Lapis Sunlight T20-04-WNT (Merck)

Example 9: Analogous to Example 3 with 2.5% Si$_3$N$_4$ E05 (A234)

6.22 g boron nitride BN 110 (Henze), 35 ml NMP, 2.07 g Fluorolink D10H (Solvay), 3.37 g PMDA, 7.51 g BAPPS, 0.52 g Si$_3$N$_4$ E05 (UBE), 1.04 g Lapis Sunlight T20-04-WNT (Merck)

Example 10: Analogous to Example 4 with 5% Si$_3$N$_4$ E05 (A235)

6.53 g boron nitride BN 110 (Henze), 35 ml NMP, 2.18 g Fluorolink D10H (Solvay), 3.37 g PMDA, 7.51 g BAPPS, 1.09 g Si$_3$N$_4$ E05 (UBE), 1.09 g Lapis Sunlight T20-04-WNT (Merck)

Example 11: Analogous to Example 5 with 10% Si$_3$N$_4$ E05 (A236)

7.26 g boron nitride BN 110 (Henze), 35 ml NMP, 2.42 g Fluorolink D10H (Solvay), 3.37 g PMDA, 7.51 g BAPPS, 2.42 g Si$_3$N$_4$ E05 (UBE), 1.21 g Lapis Sunlight T20-04-WNT (Merck)

Example 12: Analogous to Example 6 with 15% Si$_3$N$_4$ E05 (A237)

8.16 g boron nitride BN 110 (Henze), 35 ml NMP, 2.72 g Fluorolink D10H (Solvay), 3.37 g PMDA, 7.51 g BAPPS, 4.08 g Si$_3$N$_4$ E05 (UBE), 1.36 g Lapis Sunlight T20-04-WNT (Merck)

Example 13: Analogous to Example 2 with 1.25% Si$_3$N$_4$ E03 (A238)

6.08 g boron nitride BN 110 (Henze), 35 ml NMP, 2.03 g Fluorolink D10H (Solvay), 3.37 g PMDA, 7.51 g BAPPS, 0.25 g Si$_3$N$_4$ E03 (UBE), 1.01 g Lapis Sunlight T20-04-WNT (Merck)

Example 14: Analogous to Example 3 with 2.5% Si$_3$N$_4$ E03 (A239)

6.22 g boron nitride BN 110 (Henze), 35 ml NMP, 2.07 g Fluorolink D10H (Solvay), 3.37 g PMDA, 7.51 g BAPPS, 0.52 g Si$_3$N$_4$ E03 (UBE), 1.04 g Lapis Sunlight T20-04-WNT (Merck)

Example 15: Analogous to Example 4 with 5% Si$_3$N$_4$ E03 (A240)

6.53 g boron nitride BN 110 (Henze), 35 ml NMP, 2.18 g Fluorolink D10H (Solvay), 3.37 g PMDA, 7.51 g BAPPS, 1.09 g Si$_3$N$_4$ E03 (UBE), 1.09 g Lapis Sunlight T20-04-WNT (Merck)

Example 16: Analogous to Example 5 with 10% Si$_3$N$_4$ E03 (A241)

7.26 g boron nitride BN 110 (Henze), 35 ml NMP, 2.42 g Fluorolink D10H (Solvay), 3.37 g PMDA, 7.51 g BAPPS, 2.42 g Si$_3$N$_4$ E03 (UBE), 1.21 g Lapis Sunlight T20-04-WNT (Merck)

Example 17: Analogous to Example 6 with 15% Si$_3$N$_4$ E03 (A242)

8.16 g boron nitride BN 110 (Henze), 35 ml NMP, 2.72 g Fluorolink D10H (Solvay), 3.37 g PMDA, 7.51 g BAPPS, 4.08 g Si$_3$N$_4$ E03 (UBE), 1.36 g Lapis Sunlight T20-04-WNT (Merck)

Example 18: Analogous to Example 2 with 1.25% Si$_3$N$_4$ M11-A (A218)

6.08 g boron nitride BN 110 (Henze), 35 ml NMP, 2.03 g Fluorolink D10H (Solvay), 3.37 g PMDA, 7.51 g BAPPS, 0.25 g Si$_3$N$_4$ M11-A (HC Starck), 1.01 g Lapis Sunlight T20-04-WNT (Merck)

Example 19: Analogous to Example 3 with 2.5% Si$_3$N$_4$ M11-A (A219)

6.22 g boron nitride BN 110 (Henze), 35 ml NMP, 2.07 g Fluorolink D10H (Solvay), 3.37 g PMDA, 7.51 g BAPPS, 0.52 g Si$_3$N$_4$ M11-A (HC Starck), 1.04 g Lapis Sunlight T20-04-WNT (Merck)

Example 20: Analogous to Example 4 with 5% Si$_3$N$_4$ M11-A (A220)

6.53 g boron nitride BN 110 (Henze), 35 ml NMP, 2.18 g Fluorolink D10H (Solvay), 3.37 g PMDA, 7.51 g BAPPS, 1.09 g Si$_3$N$_4$ M11-A (HC Starck), 1.09 g Lapis Sunlight T20-04-WNT (Merck)

Example 21: Analogous to Example 5 with 10% Si$_3$N$_4$ M11-A (A221)

7.26 g boron nitride BN 110 (Henze), 35 ml NMP, 2.42 g Fluorolink D10H (Solvay), 3.37 g PMDA, 7.51 g BAPPS, 2.42 g Si$_3$N$_4$ M11-A (HC Starck), 1.21 g Lapis Sunlight T20-04-WNT (Merck)

Example 22: Analogous to Example 6 with 15% Si$_3$N$_4$ M11-A (A222)

8.16 g boron nitride BN 110 (Henze), 35 ml NMP, 2.72 g Fluorolink D10H (Solvay), 3.37 g PMDA, 7.51 g BAPPS, 4.08 g Si$_3$N$_4$ M11-A (HC Starck), 1.36 g Lapis Sunlight T20-04-WNT (Merck)

Example 23: Analogous to Example 2 with 1.25% Si$_3$N$_4$ B7 (A223)

6.08 g boron nitride BN 110 (Henze), 35 ml NMP, 2.03 g Fluorolink D10H (Solvay), 3.37 g PMDA, 7.51 g BAPPS, 0.25 g Si$_3$N$_4$ B7 (HC Starck), 1.01 g Lapis Sunlight T20-04-WNT (Merck)

Example 24: Analogous to Example 3 with 2.5% Si₃N₄ B7 (A224)

6.22 g boron nitride BN 110 (Henze), 35 ml NMP, 2.07 g Fluorolink D10H (Solvay), 3.37 g PMDA, 7.51 g BAPPS, 0.52 g Si₃N₄ B7 (HC Starck), 1.04 g Lapis Sunlight T20-04-WNT (Merck)

Example 25: Analogous to Example 4 with 5% Si₃N₄ B7 (A225)

6.53 g boron nitride BN 110 (Henze), 35 ml NMP, 2.18 g Fluorolink D10H (Solvay), 3.37 g PMDA, 7.51 g BAPPS, 1.09 g Si₃N₄ B7 (HC Starck), 1.09 g Lapis Sunlight T20-04-WNT (Merck)

Example 26: Analogous to Example 5 with 10% Si₃N₄ B7 (A226)

7.26 g boron nitride BN 110 (Henze), 35 ml NMP, 2.42 g Fluorolink D10H (Solvay), 3.37 g PMDA, 7.51 g BAPPS, 2.42 g Si₃N₄ B7 (HC Starck), 1.21 g Lapis Sunlight T20-04-WNT (Merck)

Example 27: Analogous to Example 6 with 15% Si₃N₄ B7 (A227)

8.16 g boron nitride BN 110 (Henze), 35 ml NMP, 2.72 g Fluorolink D10H (Solvay), 3.37 g PMDA, 7.51 g BAPPS, 4.08 g Si₃N₄ B7 (HC Starck), 1.36 g Lapis Sunlight T20-04-WNT (Merck)

Example 28: Analogous to Example 2 with 1.25% Si₃N₄ Nano70 (A228)

6.08 g boron nitride BN 110 (Henze), 35 ml NMP, 2.03 g Fluorolink D10H (Solvay), 3.37 g PMDA, 7.51 g BAPPS, 0.25 g Si₃N₄ nano70 (Aldrich), 1.01 g Lapis Sunlight T20-04-WNT (Merck)

Example 29: Analogous to Example 3 with 2.5% Si₃N₄ Nano70 (A229)

6.22 g boron nitride BN 110 (Henze), 35 ml NMP, 2.07 g Fluorolink D10H (Solvay), 3.37 g PMDA, 7.51 g BAPPS, 0.52 g Si₃N₄ nano70 (Aldrich), 1.04 g Lapis Sunlight T20-04-WNT (Merck)

Example 30: Analogous to Example 4 with 5% Si₃N₄ Nano70 (A230)

6.53 g boron nitride BN 110 (Henze), 35 ml NMP, 2.18 g Fluorolink D10H (Solvay), 3.37 g PMDA, 7.51 g BAPPS, 1.09 g Si₃N₄ nano70 (Aldrich), 1.09 g Lapis Sunlight T20-04-WNT (Merck)

Example 31: Analogous to Example 5 with 10% Si₃N₄ Nano70 (A231)

7.26 g boron nitride BN 110 (Henze), 35 ml NMP, 2.42 g Fluorolink D10H (Solvay), 3.37 g PMDA, 7.51 g BAPPS, 2.42 g Si₃N₄ nano70 (Aldrich), 1.21 g Lapis Sunlight T20-04-WNT (Merck)

Example 32: Analogous to Example 6 with 15% Si₃N₄ Nano70 (A232)

8.16 g boron nitride BN 110 (Henze), 35 ml NMP, 2.72 g Fluorolink D10H (Solvay), 3.37 g PMDA, 7.51 g BAPPS, 4.08 g Si₃N₄ nano70 (Aldrich), 1.36 g Lapis Sunlight T20-04-WNT (Merck)

Example 33: Analogous to Example 23 with 1.25% FL D10H (A243)

5.22 g boron nitride BN 110 (Henze), 35 ml NMP, 0.22 g Fluorolink D10H (Solvay), 3.37 g PMDA, 7.51 g BAPPS, 0.22 g Si₃N₄ B7 (HC Starck), 0.87 g Lapis Sunlight T20-04-WNT (Merck)

Example 34: Analogous to Example 23 with 2.5% FL D10H (A244)

5.33 g boron nitride BN 110 (Henze), 35 ml NMP, 0.44 g Fluorolink D10H (Solvay), 3.37 g PMDA, 7.51 g BAPPS, 0.22 g Si₃N₄ B7 (HC Starck), 0.89 g Lapis Sunlight T20-04-WNT (Merck)

Example 35: Analogous to Example 23 with 5% FL D10H (A245)

5.56 g boron nitride BN 110 (Henze), 35 ml NMP, 0.93 g Fluorolink D10H (Solvay), 3.37 g PMDA, 7.51 g BAPPS, 0.23 g Si₃N₄ B7 (HC Starck), 0.93 g Lapis Sunlight T20-04-WNT (Merck)

Example 36: Analogous to Example 23 with 7.5% FL D10H (A246)

5.81 g boron nitride BN 110 (Henze), 35 ml NMP, 1.45 g Fluorolink D10H (Solvay), 3.37 g PMDA, 7.51 g BAPPS, 0.24 g Si₃N₄ B7 (HC Starck), 0.97 g Lapis Sunlight T20-04-WNT (Merck)

Example 37: Analogous to Example 23 with 15% FL D10H (A247)

6.70 g boron nitride BN 110 (Henze), 35 ml NMP, 3.35 g Fluorolink D10H (Solvay), 3.37 g PMDA, 7.51 g BAPPS, 0.28 g Si₃N₄ B7 (HC Starck), 1.12 g Lapis Sunlight T20-04-WNT (Merck)

Example 38: Analogous to Example 25 with 10% PDMS Diol-700 Instead of 10% FL D10H (A225-PMDS Diol-700)

6.53 g of boron nitride BN 110 (Henze) are mixed with 35 ml of NMP and 2.18 g of PDMS diol-700 (Aldrich CAS: 70131-67-8, poly(dimethylsiloxane), hydroxy terminated, $M_n$~550, chain length, 7-8 Si units $C_{14}H_{44}O_8Si_7$ mol. wt.: 537.09 $C_{16}H_{50}O_9Si_8$ mol. wt.: 611.25) in a Dispermat at 50° C. and 2000 rpm over 15 minutes. Then 3.37 g of PMDA, 7.51 g of BAPPS and 1.09 g of Si₃N₄ B7 (HC Starck) are added, followed by dispersion for 90 minutes more at 50° C. and 2000 rpm. Following removal of the glass beads, 1.09 g of Lapis Sunlight T20-04-WNT (Merck) are added, and the overall mixture obtained is mixed using a dissolver disk for 30 minutes at 25° C. and 1000 rpm. A homogeneous, liquid reactive mixture is obtained, with a pale brownish coloration.

Example 39: Analogous to Example 19 with 10% PEG-Block-PPG-Block-PEG Instead of 10% FL D10H (A219-PEG-b-PPG-b-PEG)

6.22 g of boron nitride BN 110 (Henze) are mixed with 35 ml of NMP and 2.07 g of polyethylene glycol)-block-poly (propylene glycol)-block-poly(ethylene glycol) (Aldrich 435406 CAS [9003-11-6] $M_n$~1100, $HO(C_2H_4O)_m$ $(C_3H_6O)_n$ $(C_2H_4O_mH)$ in a Dispermat at 50° C. and 2000 rpm over 15 minutes. Then 3.37 g of PMDA, 7.51 g of BAPPS and 0.52 g of $Si_3N_4$ M11-A (HC Starck) are added, followed by dispersion for 90 minutes more at 50° C. and 2000 rpm. Following removal of the glass beads, 1.04 g of Lapis Sunlight T20-04-WNT (Merck) are added, and the overall mixture obtained is mixed using a dissolver disk for 30 minutes at 25° C. and 1000 rpm. A homogeneous, liquid reactive mixture is obtained, with a pale brownish coloration.

Comparative Compositions without Lubricant

Comparative Example 1: No Lubricant, No Pigment, No Hard Material, No Surface-Active Compound (A265)

3.37 g of PMDA and 7.51 g of BAPPS are mixed with 35 ml of NMP in a Dispermat at 50° C. and 2000 rpm over 115 minutes. Following removal of the glass beads, a homogeneous, liquid reactive mixture is obtained, with a brownish coloration.

Comparative Example 2: No Lubricant, No Pigment, No Hard Material, with Surface-Active Compound (A119)

3.37 g of PMDA, 7.51 g of BAPPS, and 2.07 g of Fluorolink D10H (Solvay) are mixed with 35 ml of NMP in a Dispermat at 50° C. and 2000 rpm over 115 minutes. Following removal of the glass beads, a homogeneous, liquid reactive mixture is obtained, with a brownish coloration.

Comparative Example 3: No Lubricant, with Pigment, No Hard Material, with Surface-Active Compound (A219-14)

3.37 g of PMDA, 7.51 g of BAPPS, and 2.07 g of Fluorolink D10H (Solvay) are mixed with 35 ml of NMP in a Dispermat at 50° C. and 2000 rpm over 115 minutes. Following removal of the glass beads, 1.04 g of Lapis Sunlight T20-04-WNT (Merck) are added and the overall mixture obtained is mixed using a dissolver disk over 30 minutes at 25° C. and 1000 rpm. This gives a homogeneous, liquid reactive mixture with a pale brownish coloration.

Comparative Example 4: No Lubricant, with Pigment, with Hard Material, with Surface-Active Compound (A219-12)

3.37 g of PMDA and 7.51 g of BAPPS are mixed with 35 ml of NMP and 2.07 g of Fluorolink D10H (Solvay) in a Dispermat at 50° C. and 2000 rpm over 15 minutes. Subsequently 0.52 g of $Si_3N_4$ M11-A (HC Starck) is added, and dispersion is continued for 90 minutes more at 50° C. and 2000 rpm. Following removal of the glass beads, 1.04 g of Lapis Sunlight T20-04-WNT (Merck) are added and the overall mixture obtained is mixed using a dissolver disk over 30 minutes at 25° C. and 1000 rpm. This gives a homogeneous, liquid reactive mixture with a pale brownish coloration.

Comparative Compositions with Lubricant

Comparative Example 5: With Lubricant, No Pigment, No Hard Material, No Surface-Active Compound (A269)

6.22 g of boron nitride BN 110 (Henze) are mixed with 35 ml of NMP in a Dispermat at 50° C. and 2000 rpm over 15 minutes. Then 3.37 g of PMDA and 7.51 g of BAPPS are added and dispersion is continued for 90 minutes more at 50° C. and 2000 rpm. Following removal of the glass beads, a homogeneous, liquid reactive mixture is obtained which has a pale brownish coloration.

Comparative Example 6: With Lubricant, with Pigment, No Hard Material, No Surface-Active Compound (A219-16)

6.22 g of boron nitride BN 110 (Henze) are mixed with 35 ml of NMP in a Dispermat at 50° C. and 2000 rpm over 15 minutes. Then 3.37 g of PMDA and 7.51 g of BAPPS are added, followed by dispersion for 90 minutes more at 50° C. and 2000 rpm. Following removal of the glass beads, 1.04 g of Lapis Sunlight T20-04-WNT (Merck) are added, and the resulting overall mixture is mixed using a dissolver disk for 30 minutes at 25° C. and 1000 rpm. A homogeneous, liquid reactive mixture is obtained, which has a pale brownish coloring.

Comparative Example 7: With Lubricant, with Pigment, with Hard Material, No Surface-Active Compound (A219-15)

6.22 g of boron nitride BN 110 (Henze) are mixed with 35 ml of NMP in a Dispermat at 50° C. and 2000 rpm over 15 minutes. Then 3.37 g of PMDA, 7.51 g of BAPPS, and 0.52 g of $Si_3N_4$ M11-A (HC Starck) are added, followed by dispersion for 90 minutes more at 50° C. and 2000 rpm. Following removal of the glass beads, 1.04 g of Lapis Sunlight T20-04-WNT (Merck) are added, and the resulting overall mixture is mixed using a dissolver disk for 30 minutes at 25° C. and 1000 rpm. A homogeneous, liquid reactive mixture is obtained, which has a pale brownish coloring.

Comparative Example 8: With Lubricant, No Pigment, No Hard Material, with Surface-Active Compound (A274)

6.22 g of boron nitride BN 110 (Henze) are mixed with 35 ml of NMP and 2.07 g of Fluorolink D10H (Solvay) in a Dispermat at 50° C. and 2000 rpm over 15 minutes. Then 3.37 g of PMDA and 7.51 g of BAPPS are added and dispersion is continued for 90 minutes more at 50° C. and 2000 rpm. Following removal of the glass beads, a homogeneous, liquid reactive mixture is obtained which has a pale brownish coloration.

Comparative Example 9: With Lubricant, No Pigment, with Hard Material, with Surface-Active Compound (A65)

6.53 g of boron nitride BN 110 (Henze) are mixed with 35 ml of NMP and 2.18 g of Fluorolink D10H (Solvay) in a Dispermat at 50° C. and 2000 rpm over 15 minutes. Then 3.37 g of PMDA, 7.51 g of BAPPS, and 1.09 g of SiC UF10 (HC Starck) are added and dispersion is continued for 90 minutes more at 50° C. and 2000 rpm. Following removal of the glass beads, a homogeneous, liquid reactive mixture is obtained which has a dark brownish coloration.

Figure 22:
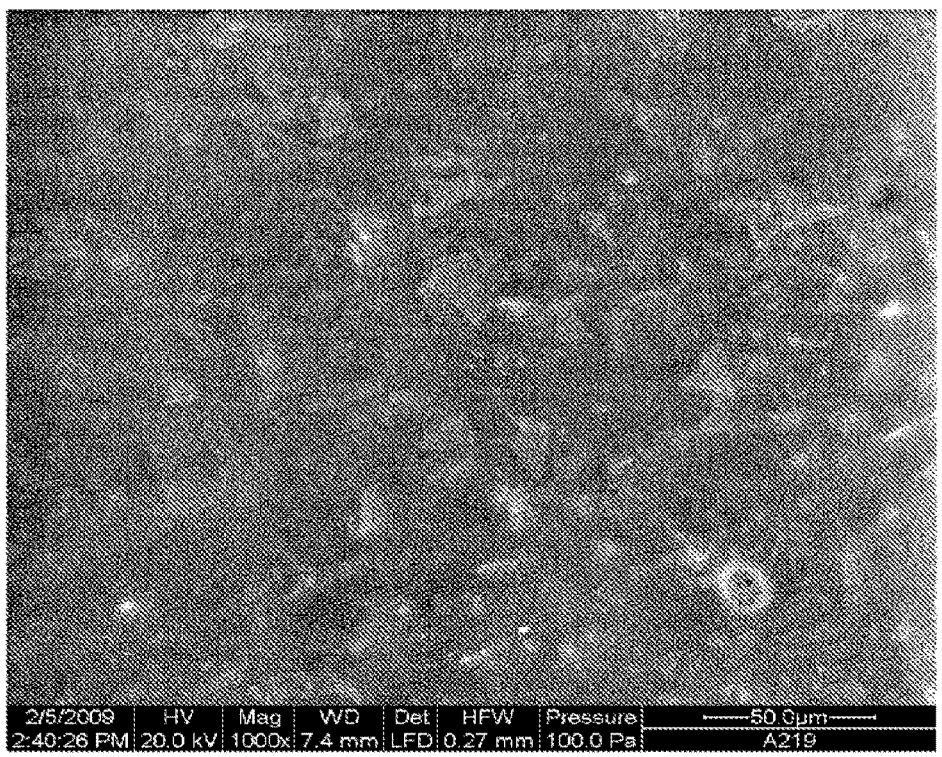
FIG. 22 SEM micrograph of A219, plan view.
Figure 23:
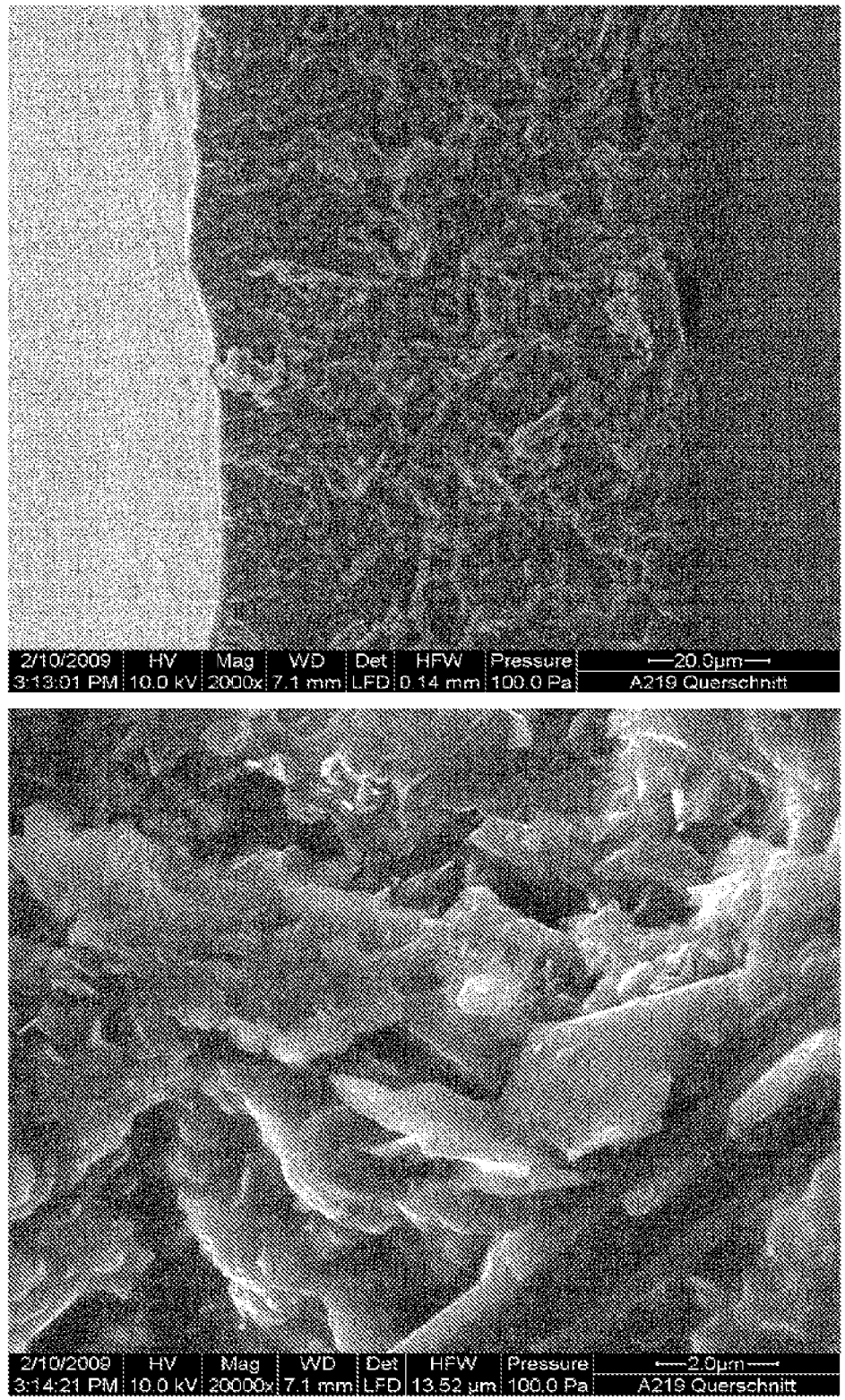
FIG. 23 SEM micrograph of A219, cross section.

FIG. 22 and FIG. 23 show, as an example, the construction of the composite material A219.

Tribology

The compositions produced were applied to stainless steel plates and cured thermally as described. The film thickness was 20-25 μm. The samples were subsequently subjected to measurement in a ball-on-disk tribometer.

The measurements were conducted under the following collective loading:

Ball-on-disk tribometer (DIN 50324), measurement under air, 100Cr6 ball with 4 mm diameter, circular radius: 16 mm, applied force: 2 N, track speed: 10 cm/s, loading distance: 1 km.

Figure 15:
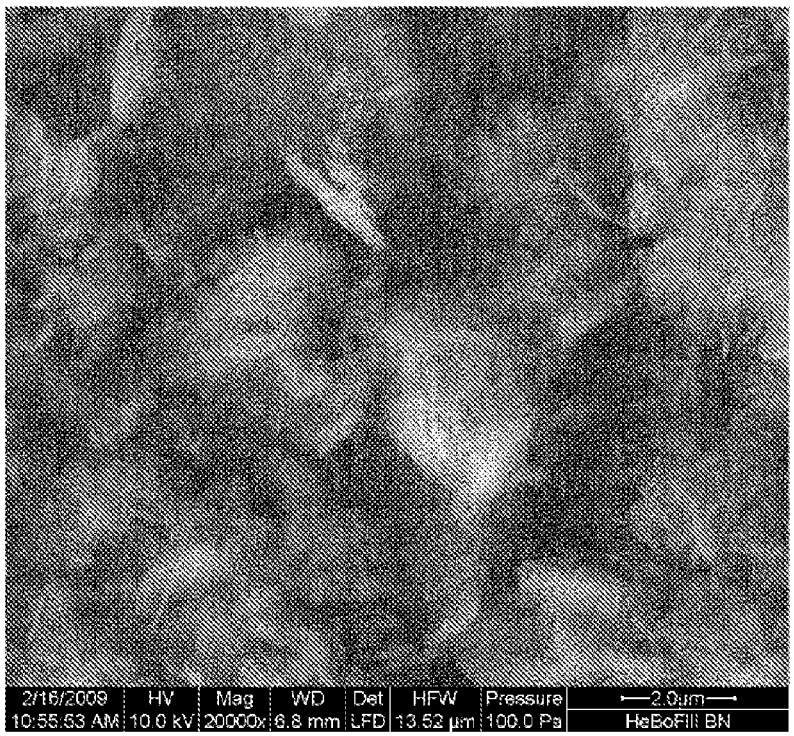
FIG. 15 SEM micrograph of Hebofil BN 110.
Figure 16:
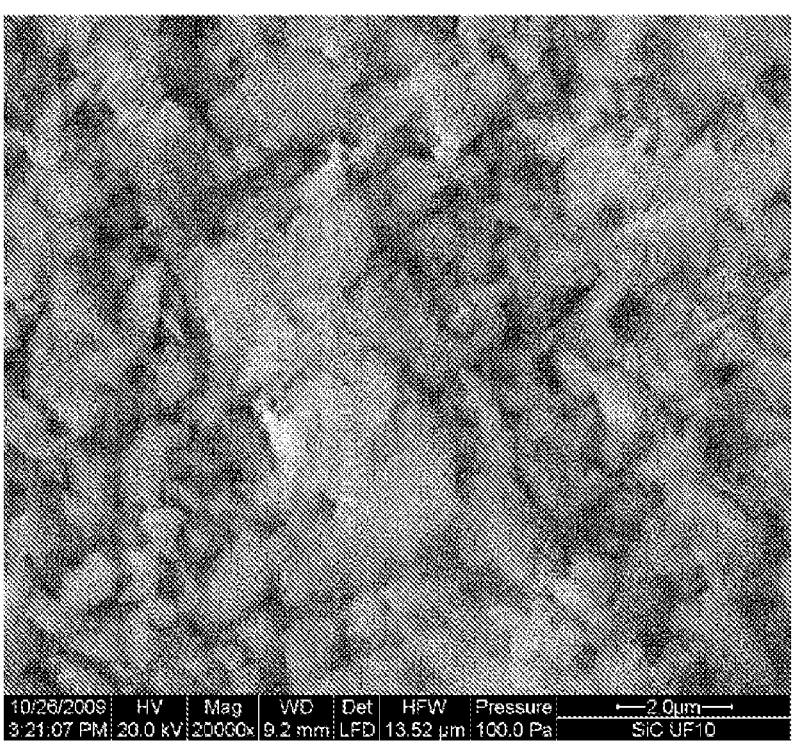
FIG. 16 SEM micrograph of SiC.

FIG. 1 shows the influence of different pigment particles (5 wt %) on the coefficient of sliding friction in the system with 5 wt % SiC hard material particles and 30 wt % BN 110 particles. FIG. 16 and FIG. 15 show representative SEM micrographs of the SiC and BN 110 particles used, respectively.

Figure 2:
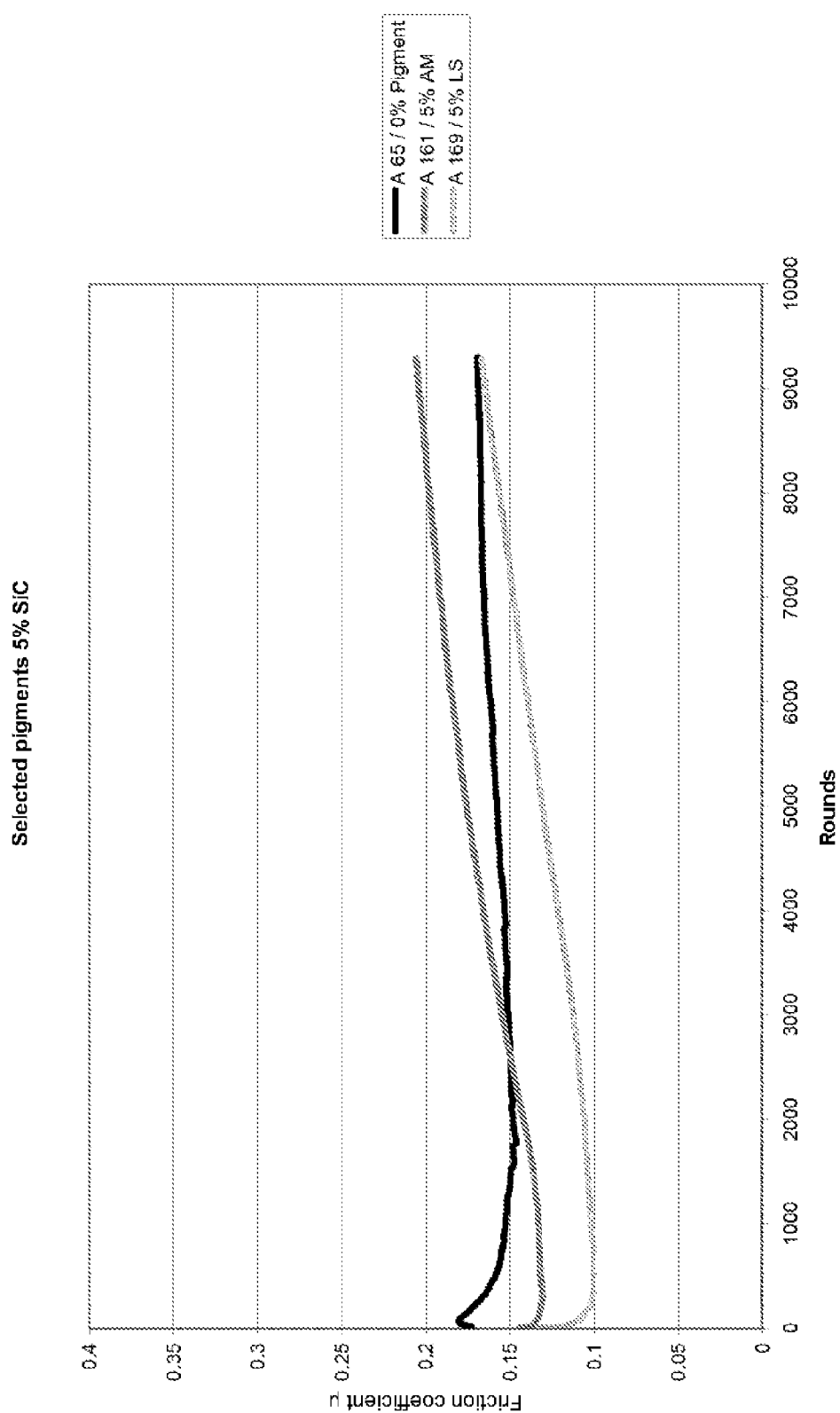
FIG. 2 comparison of selected pigment particles in terms of their influence on the friction coefficient μ for a pigment concentration of 5 wt % (BN 110: 30 wt %, SiC: 5 wt %); AM: Autumn Mystery, LS: Lapis Sunlight); A 65: comparative sample without pigment.
Figure 20:
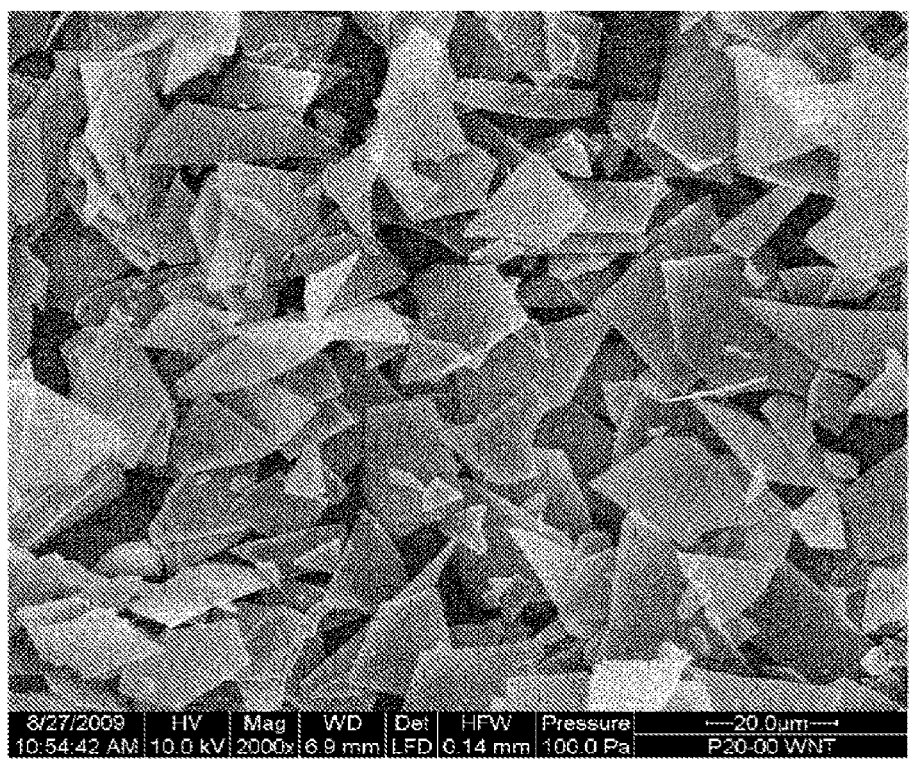
FIG. 20 SEM micrograph of Autumn Mystery pigment particles with $FeO_x$ surface.
Figure 21:
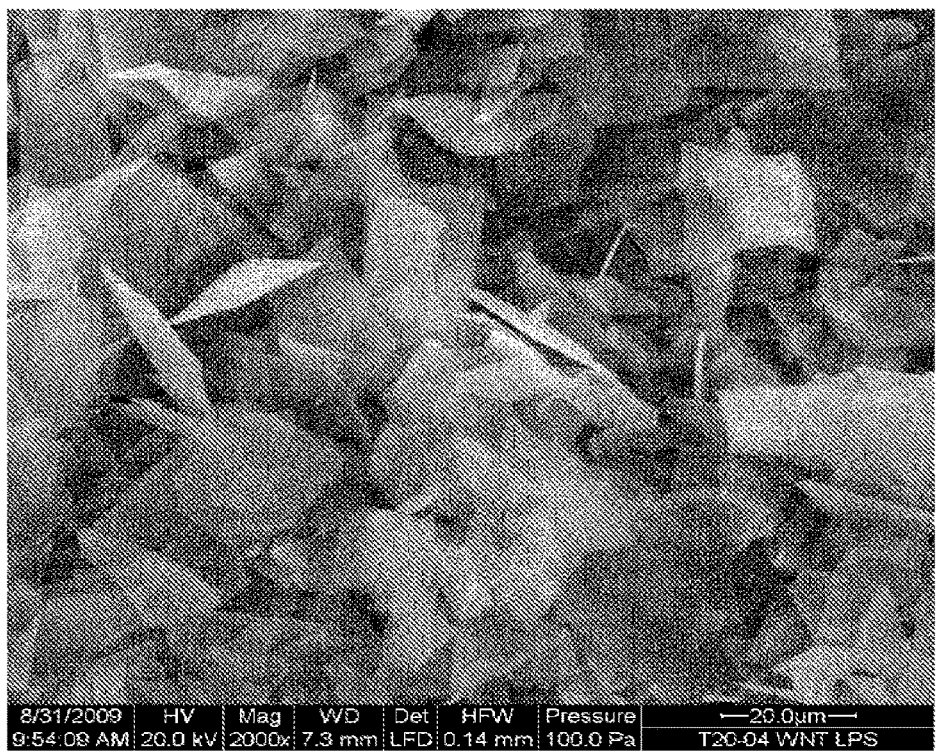
FIG. 21 SEM micrograph of Lapis Sunlight pigment particles with $TiO_2$ surface.

It is notable here that apparently a relatively large number of different types of pigment contribute to a reduction in the friction coefficient in the initial phase of the measurement, over 3000-4000 rounds, relative to the comparative composition without such pigment. Since the aspect ratio of the pigment particles to one another is relatively similar, the surface chemistry probably plays a critical part in terms of the extent of the reduction in friction. In order to show the effect even more clearly, FIG. 2 shows the composites with Lapis Sunlight and with Autumn Mystery as pigments, in comparison to the composite without pigment. SEM micrographs of the two pigments are shown in FIG. 20 and FIG. 21.

Autumn Mystery reduces the friction coefficient over a path of 2000 rounds, while Lapis Sunlight shows the positive effect even over 9000 rounds.

In summary, in view of particular significance, it can be stated that the addition of a platelet-shaped filler which is initially tribologically inactive, in the form of pigment particles, to a low-friction coating system consisting of a polymer matrix, a solid-state lubricant, and a hard material, leads to a further reduction in friction. This finding represents the focal point of the above invention. The effect found can be explained only by way of a new morphology, hitherto undescribed in the art, within the composite material formed. The compositions described below serve to define the relevant compositions.

Figure 3:
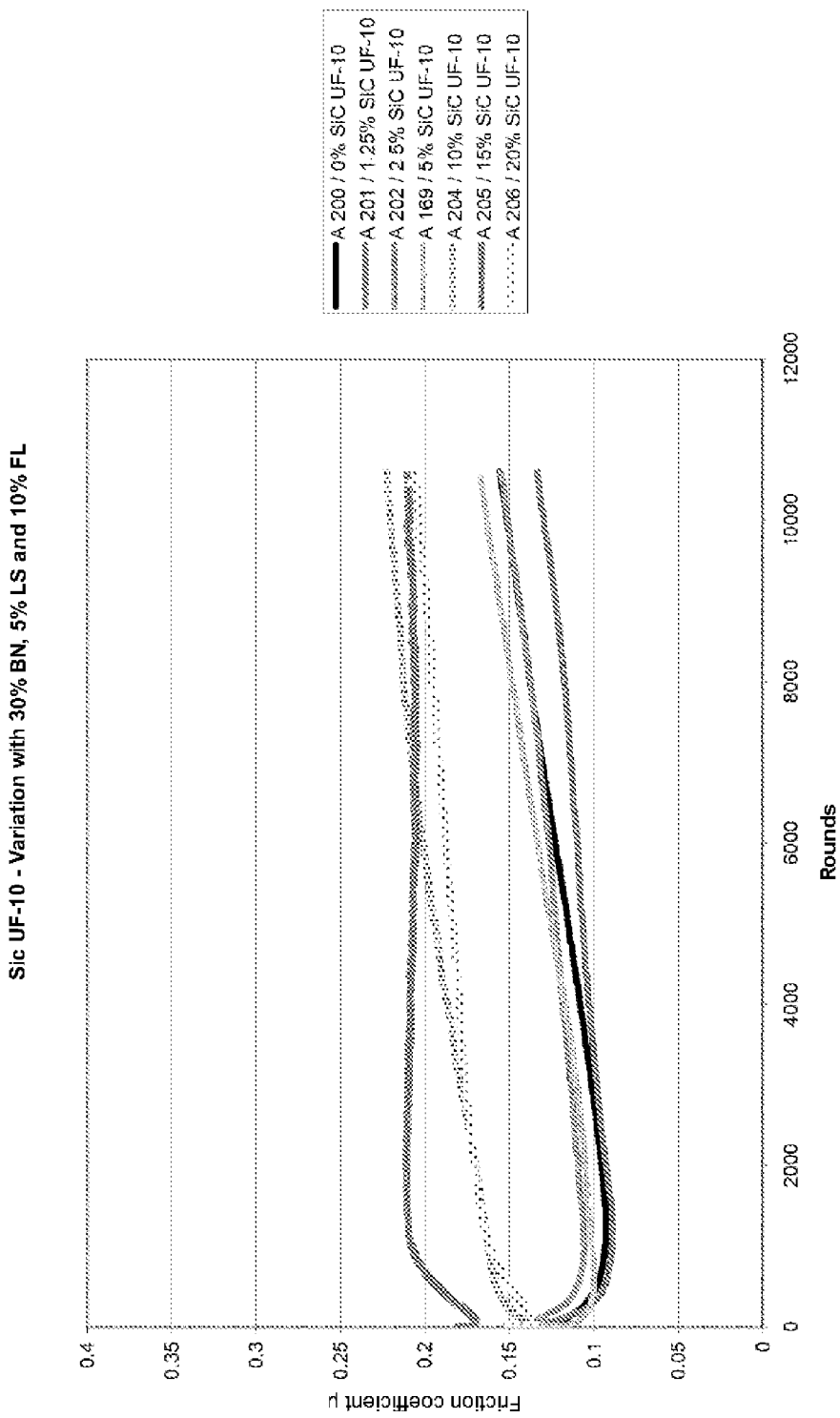
FIG. 3 variation of SiC UF-10 for 5% Lapis 5 and 10% FL.

It can be expected that a hard material of very high hardness will be able to lead, above a defined concentration, to destruction of the comparatively soft pigment particles in the tribological experiment. For this purpose, the concentration of SiC was raised in steps in the system with SiC as hard material and with the Lapis Sunlight pigment particle with the best reduction in friction. The compositions are shown in table 1. The results of the tribometer measurements are shown in FIG. 3. FIG. 16 shows a representative SEM micrograph of the SiC. The morphology of the particles can be designated as shapeless-angular. The particle size distribution is broad, and ranges from particles with about 50 nm up to about 2 μm.

Accordingly, the addition of SiC as hard material, from about 10 wt %, results in an adverse effect on the coefficient of sliding friction.

Figure 4:
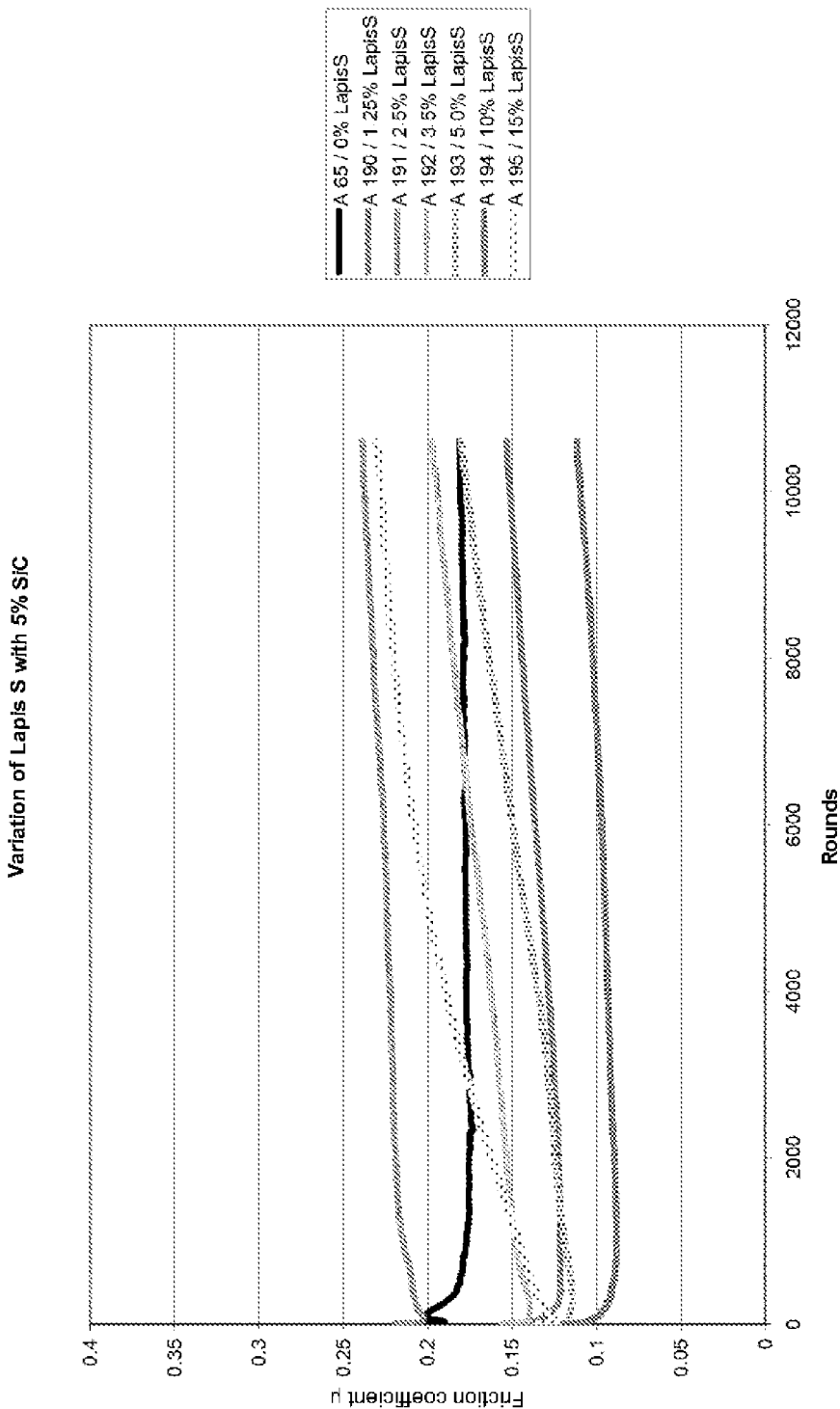
FIG. 4 variation of Lapis S in the SiC system.

An additional point of interest was the influence of the concentration of Lapis Sunlight at constant SiC hard material concentration. Table 2 and FIG. 4 show the compositions of the composites and also the corresponding results of the tribometer measurements.

The results of measurement show that a favorable effect is no longer obtained only at pigment concentrations of above about 10 wt %.

A further matter of interest was the additional systematic construction of the system in terms of the individual components, in order to have corresponding comparative examples available. This systematic construction, in the sense of a stepwise combination of components, was carried out first of all for the system containing SiC as hard material. Table 3 shows the compositions of interest. The inventive composition is A193. It is the reproduction of A169 and is identical to the latter in its composition. All other compositions are comparative examples.

Figure 5:
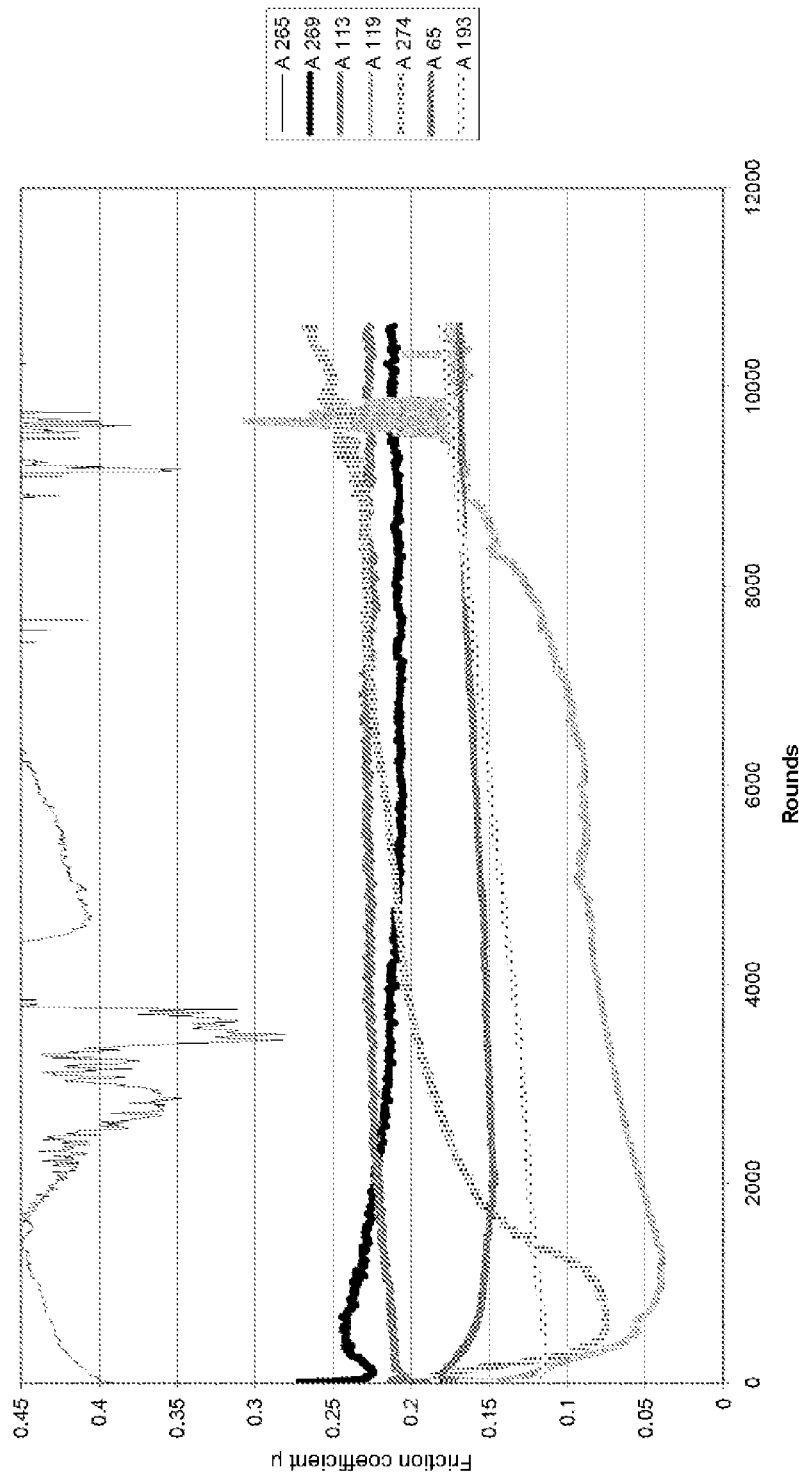
FIG. 5 systematic construction of SiC system; A193=inventive composition; A113, A119, A274, and A65=comparative examples.

The associated tribological measurements are shown in FIG. 5.

The pure matrix with 35 wt % BN 110 (A113) shows a sliding coefficient which is comparatively high for a low-friction coating, with μ0.22, but with a high level of constancy over the distance of 10 000 rounds. The addition of FL D10H to the pure matrix without BN 110 (A119) leads to very low initial friction coefficients of down to μ=0.05, which in phenomenological terms suggest a hydrodynamic lubrication. This indicates that FL D10H is possibly not being incorporated completely into the polyimide matrix. The slope of the further course of the plot indicates a relatively high rate of wear in this system. Shortly before the 10 000 rounds are reached, layer failure occurs, as evident from the sharp fluctuations in measurement values. When BN 110 and FL D10H are combined (A274), low initial friction coefficients are likewise obtained, but the layer wears even faster than with the additives individually. This indicates that the layer has become very soft overall as a result of the two additives in total. The addition of additional SiC hard material particles (A65) shows that the sliding coefficient can be harmonized over the entire measurement distance at μ values of between 0.15 and 0.18. This is the classic case of the effect of a hard material on the sliding behavior. By adjustment of the inventive composition with additional platelet-shaped pigment particles (A193), in addition to the harmonization, a further lowering of the sliding coefficient is achieved, particularly in the initial phase of the loading.

All in all, however, the curve profile for A193 indicates that there is still marked wear occurring. The cause of this might be considered to be the particles of hard SiC material, which can have an abrasive effect on the overall system if they are removed from the layer surface by the opposing element. The wear problem can be minimized by reducing the hardness of the particles of hard material. In this respect, silicon nitride (universal hardness HU: about 1500 MPa) is a suitable substitute for silicon carbide (universal hardware HU: about 2500 MPa).

The tables (table 4, table 5, table 6, table 7, table 8) and figures (FIG. 6, FIG. 7, FIG. 8, FIG. 9, FIG. 10) show in this context the dependency relationship between the sliding behavior and the concentration of hard material for various types of silicon nitride with different particle size distributions and morphologies in combination with concentrations of BN 110, Lapis S, and FL D10H that are fixed in each case.

In the majority of cases, these systems display a uniform profile of sliding coefficient below 0.13 with only a small increase over the loading distance. In a number of cases, indeed, the sliding coefficient runs at below a µ=0.1 over the entire duration of measurement.

Figure 6:
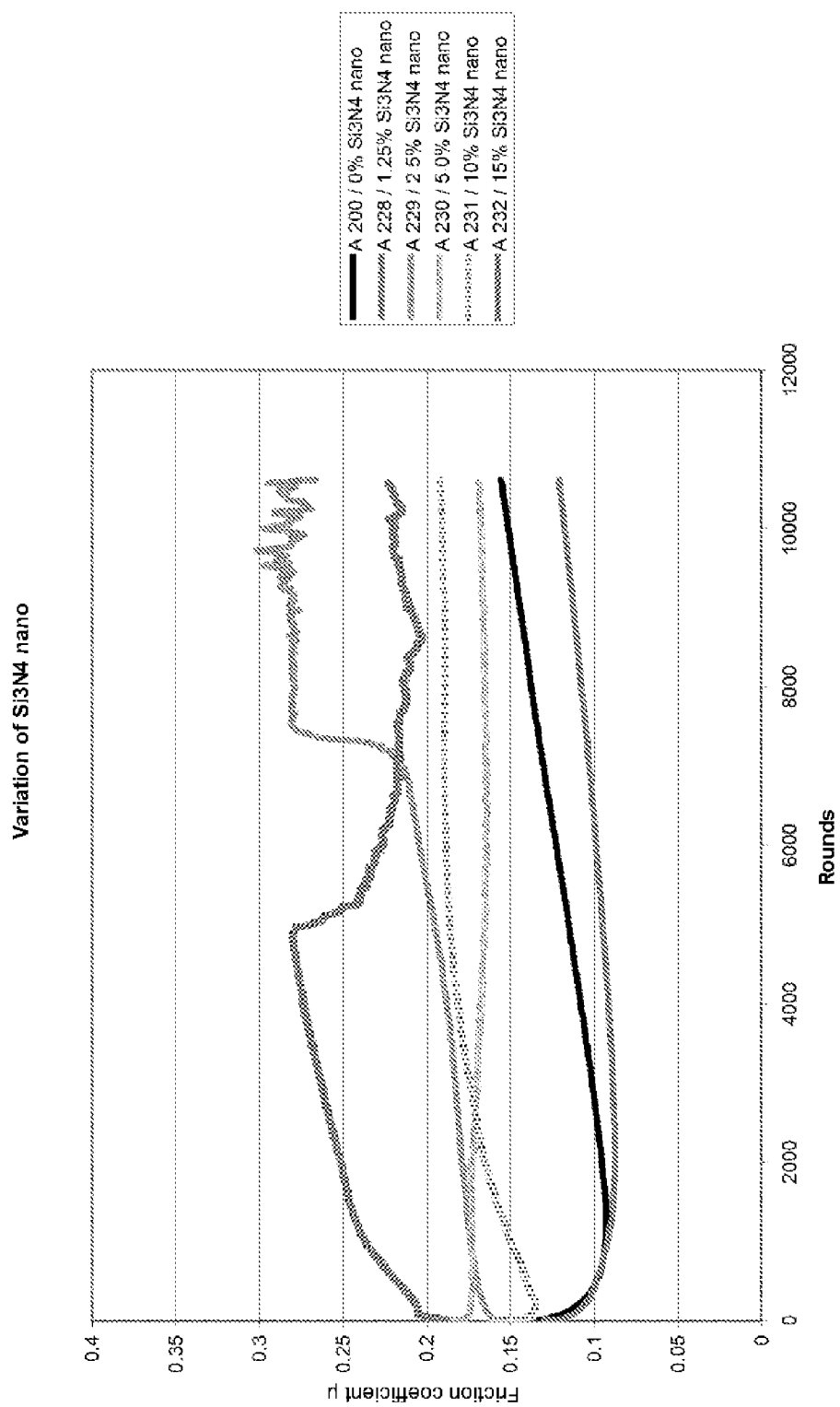
FIG. 6 variation of $Si_3N_4$ nano70 content.

Table 4 and FIG. 6 show the influence of the hard material $Si_3N_4$ nano70 with nanoscale particles. The particle size distribution is between 10 nm and 200 nm. In morphological terms, the particle form can be described as shapeless to spherical.

The nanoscale $Si_3N_4$ particles appear to be suitable for rational use only at up to about 5 wt %. At higher concentrations, layer failure is observed.

Figure 7:
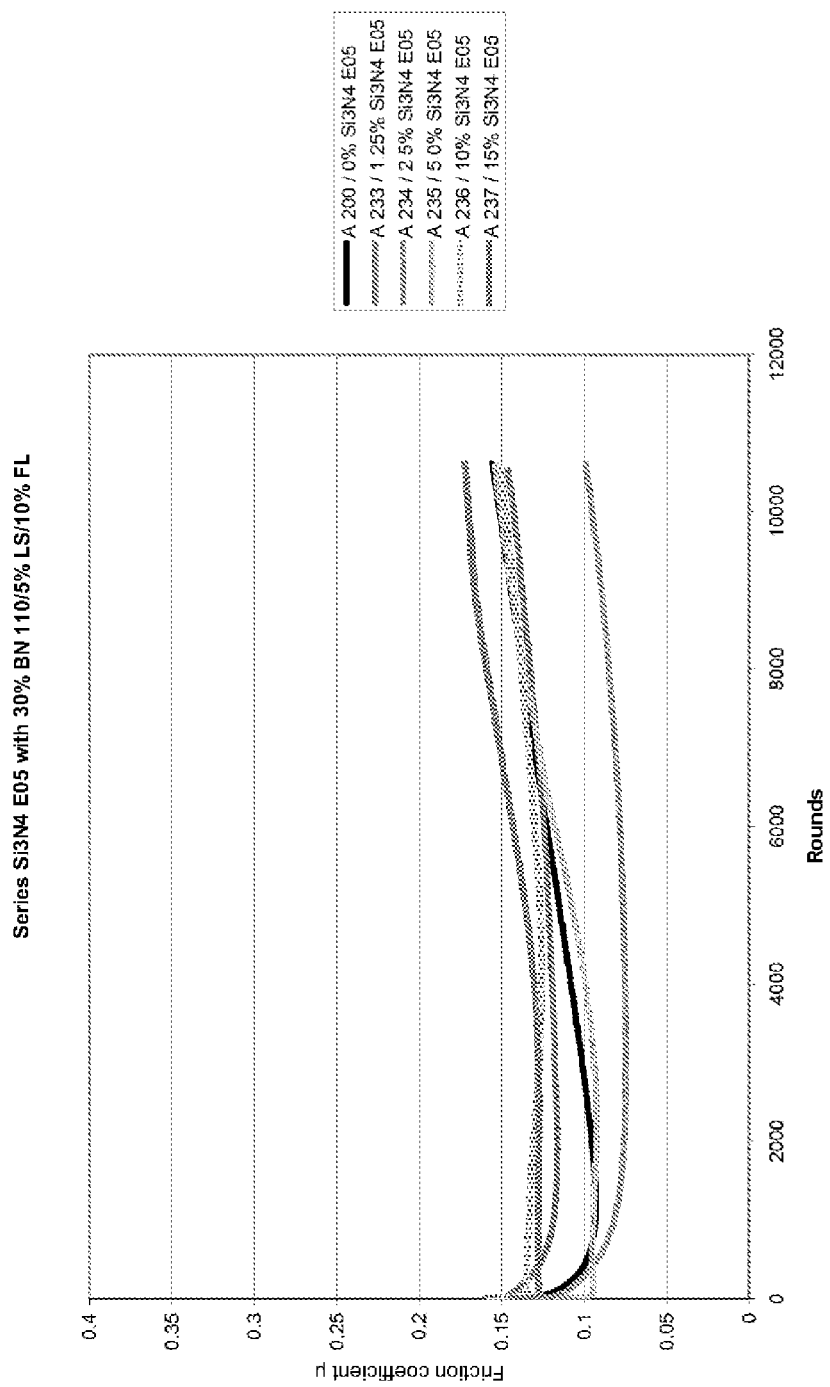
FIG. 7 variation of $Si_3N_4$ E05.
Figure 17:
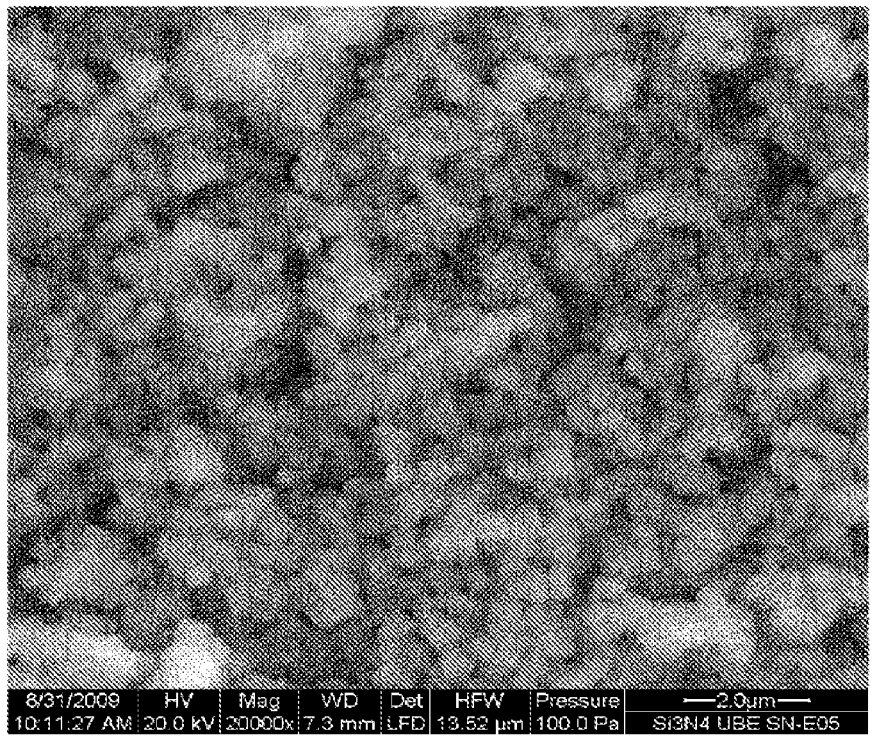
FIG. 17 SEM micrograph of hard material particles $Si_3N_4$ E05.

Table 5 and FIG. 7 show the effect of the hard material $Si_3N_4$ E05, with coarser nanoscale particles. Particle size distribution is between 300 nm and 800 nm. In morphological terms, the particle shape can be described as cubelike. A representative scanning electron micrograph is shown in FIG. 17.

Coarse $Si_3N_4$ particles in the nanometer range produce systems with a decidedly unitary profile up to about 15 wt %, and a much smaller increase than with SiC hard material.

Figure 8:
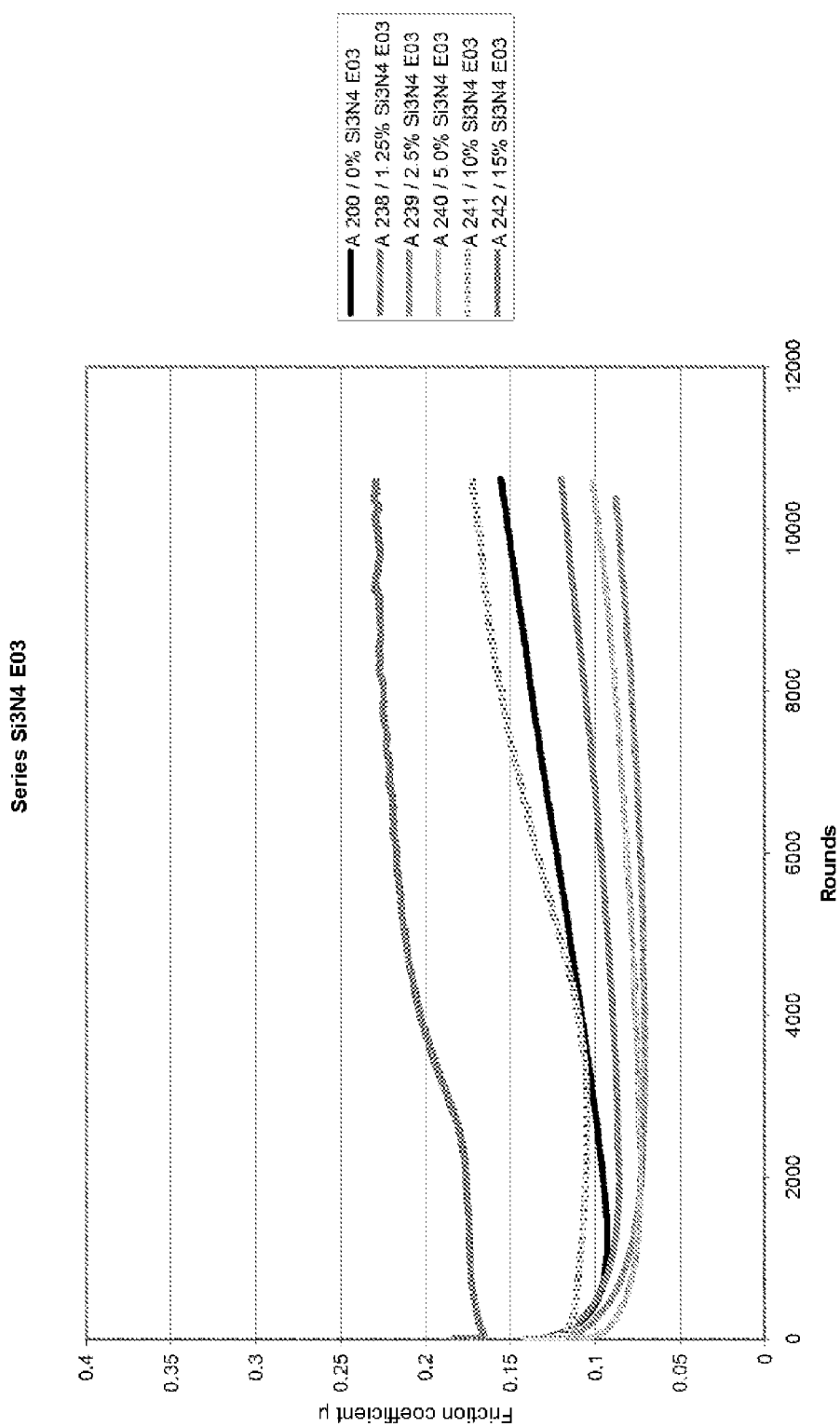
FIG. 8 variation of $Si_3N_4$ E03.
Figure 18:
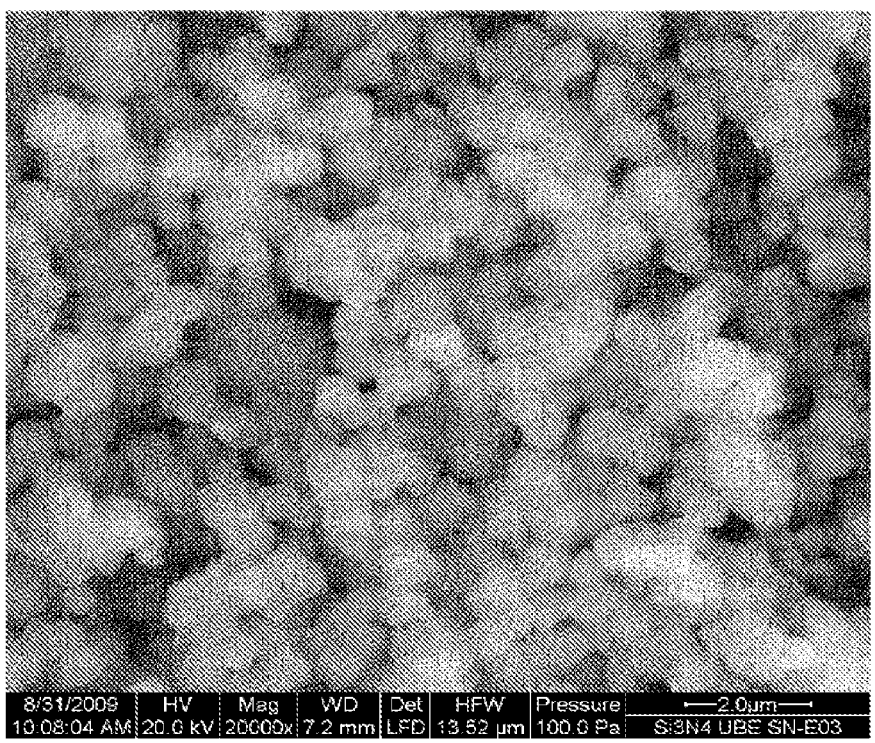
FIG. 18 SEM micrograph of hard material particles $Si_3N_4$ E03.

Table 6 and FIG. 8 show the effect of the hard material $Si_3N_4$ E03, with submicroscale particles. Particle size distribution is between 400 nm and 900 nm. In morphological terms, the particle shape can be described as cubelike. A representative scanning electron micrograph is shown in FIG. 18.

$Si_3N_4$ particles in the submicrometer range produce systems with a decidedly unitary profile up to about 10 wt %, and a much smaller increase than with SiC hard material.

Figure 9:
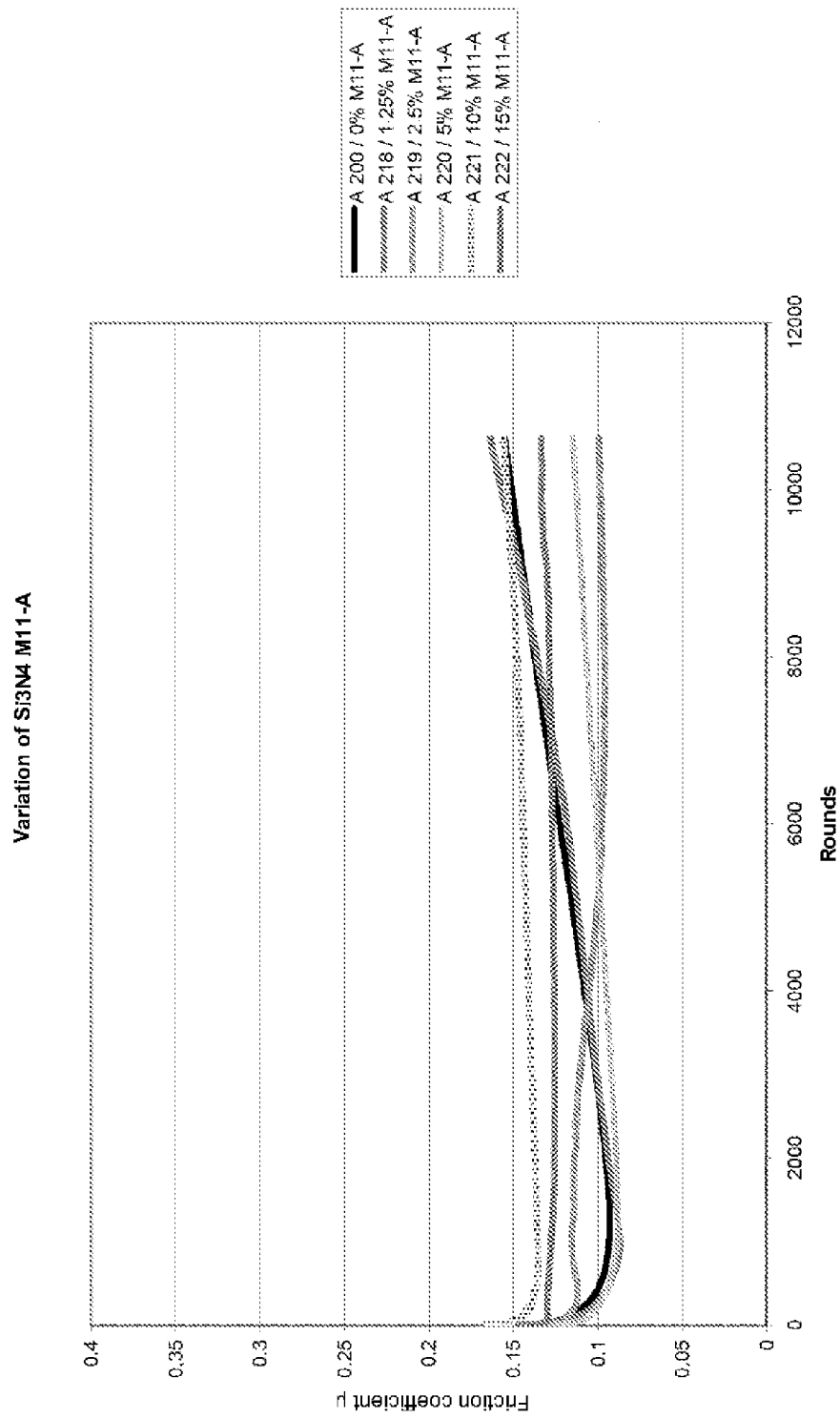
FIG. 9 variation of $Si_3N_4$ M11-A (broad distribution) content.
Figure 19:
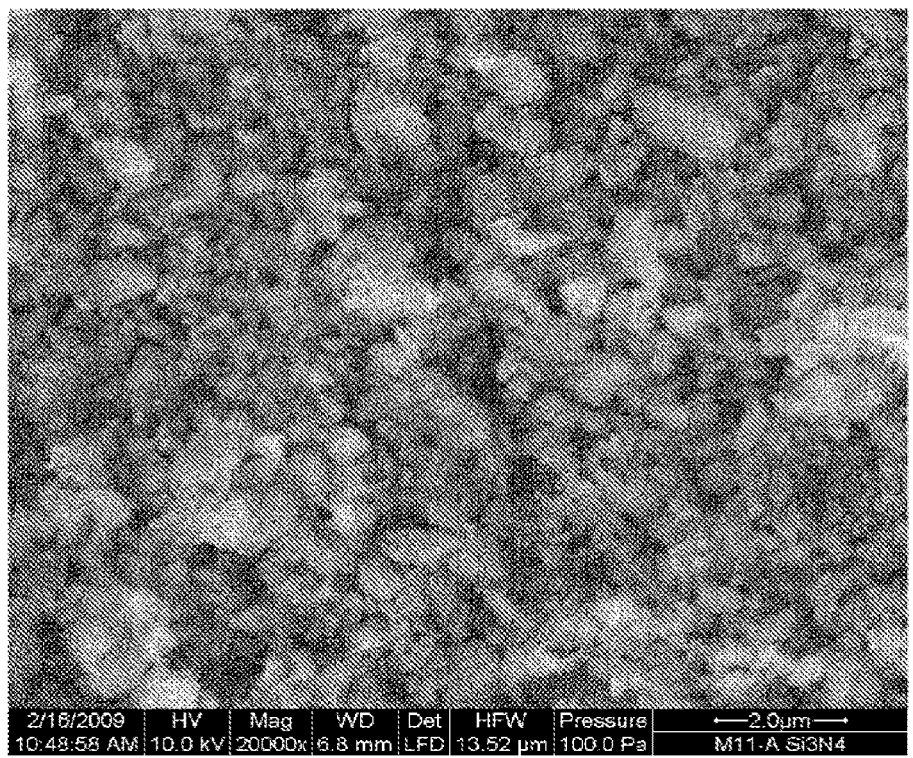
FIG. 19 SEM micrograph of hard material particles $Si_3N_4$ M11-A.

Table 7 and FIG. 9 show the effect of the hard material $Si_3N_4$ M11-A, with submicroscale to microscale particles. Particle size distribution is broad and is between 100 nm and 2 µm. In morphological terms, the particle shape can be described as shapeless. A representative scanning electron micrograph is shown in FIG. 19.

Systems with $Si_3N_4$ hard material with broad particle size distribution likewise produce a great harmonization of the sliding coefficient over the entire loading distance.

Figure 10:
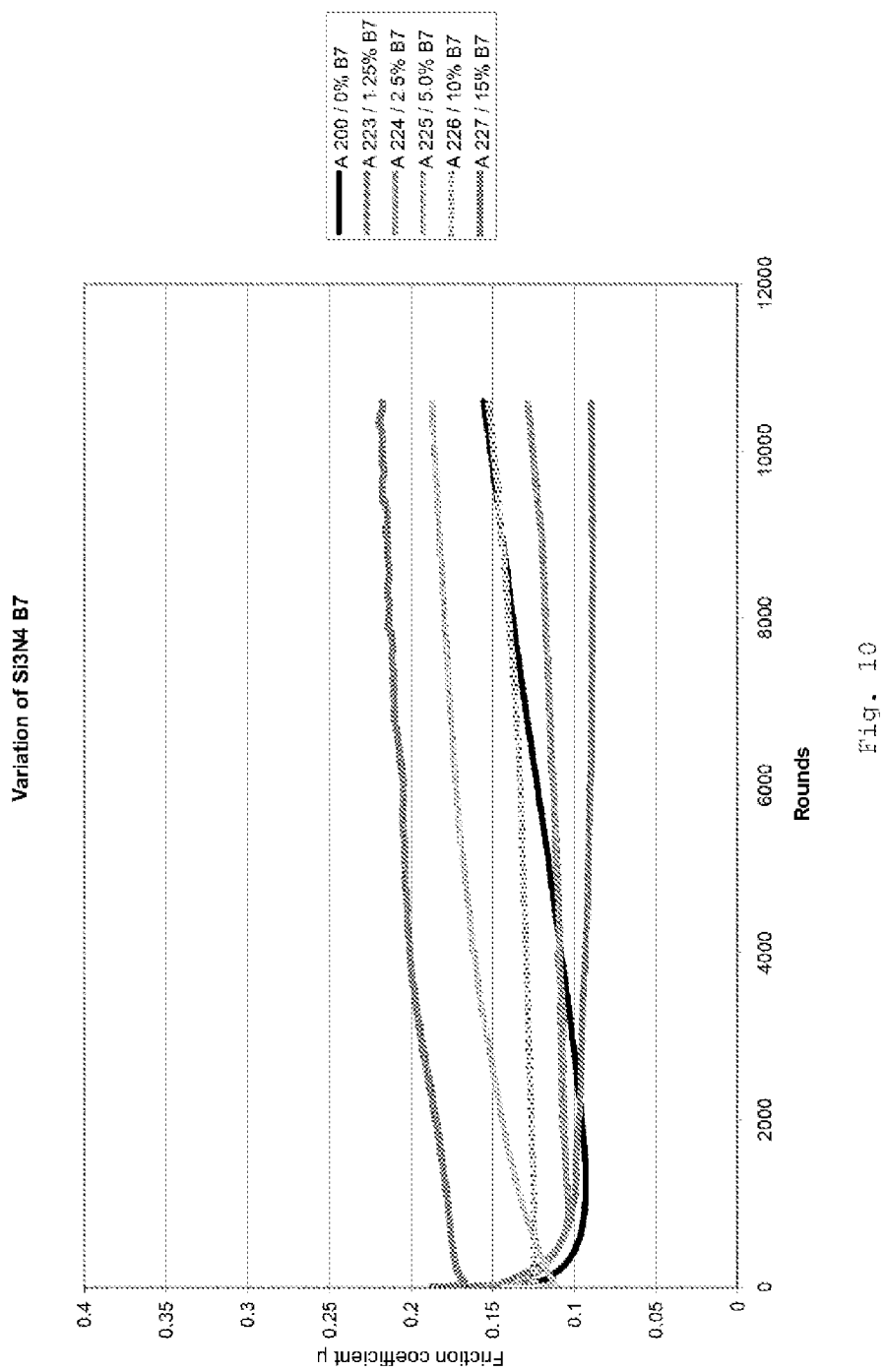
FIG. 10 variation of $Si_3N_4$ B7 (3.0 μm) content.
Figure 11:
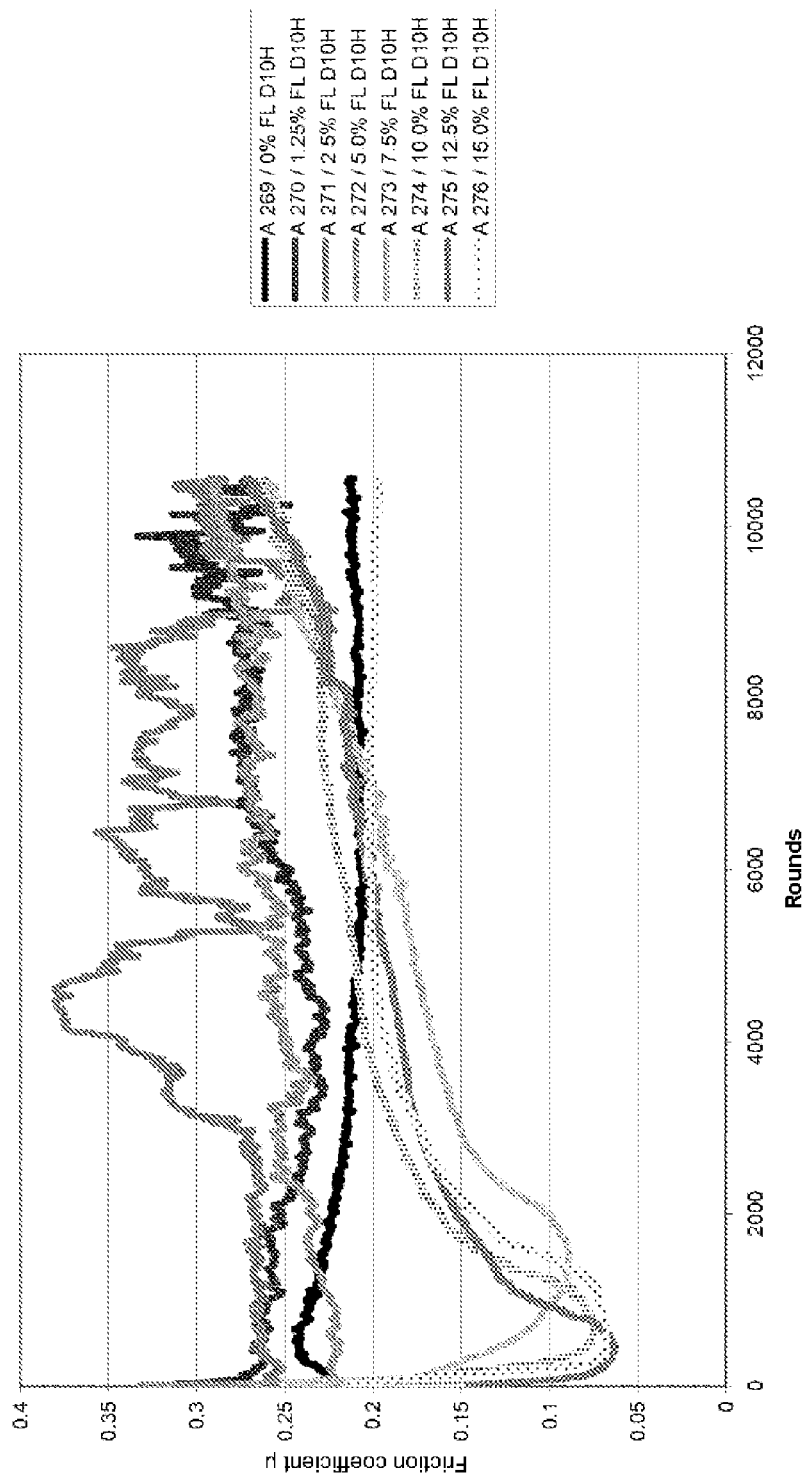
FIG. 11 variation of FL D10H content in the system without hard material.

Table 8 and FIG. 10 show the effect of the hard material $Si_3N_4$ B7 with microscale particles.

Up to about 10 wt %, the system series with $Si_3N_4$ B7 behaves similar to the series with E05 and E03.

In summary it can be stated that the silicon nitride hard materials, on account of their not excessively extreme hardness as compared with silicon carbide, are less abrasive for the formation of the transfer film, and as a result a low sliding coefficient is achieved consistently over a long loading distance. Moreover, as a result of the lower abrasive effect, the pigment particles are not destroyed and are able to exert their tribological action in the above-described, inventive sense.

The system series with $Si_3N_4$ B7 shows a balanced behavior for constant FL D10H content of 10 wt %. In order to discover the optimum concentration of this component in relation to the tribological properties, the FL D10H content was varied on the basis of an $Si_3N_4$ B7 concentration of 1.25 wt % (table 10, FIG. 12).

It is found that in this system series, from 10 wt % of FL D10H (A223) onward, the desired tribological activity ensues. In order to rule out a purely hydrodynamic lubricating effect on the part of the FL D10H, individual components were added systematically to the starting polymer matrix material for the parallel system series with $Si_3N_4$ M11-A as hard material in comparison to the A219 system (analogous composition to A223).

Figure 12:
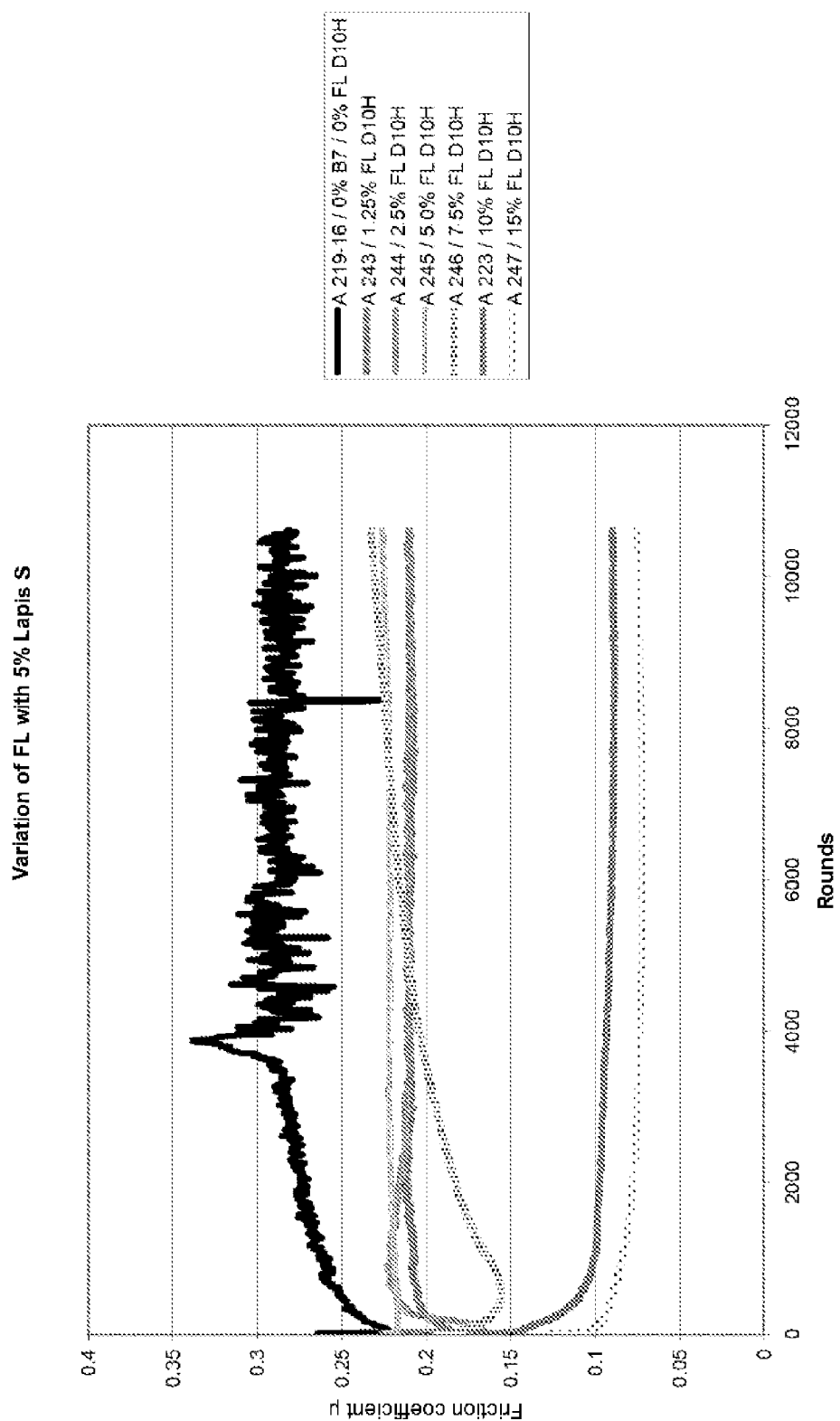
FIG. 12 variation of FL D10H content in the $Si_3N_4$ B7 (3.0 μm) system.
Figure 13:
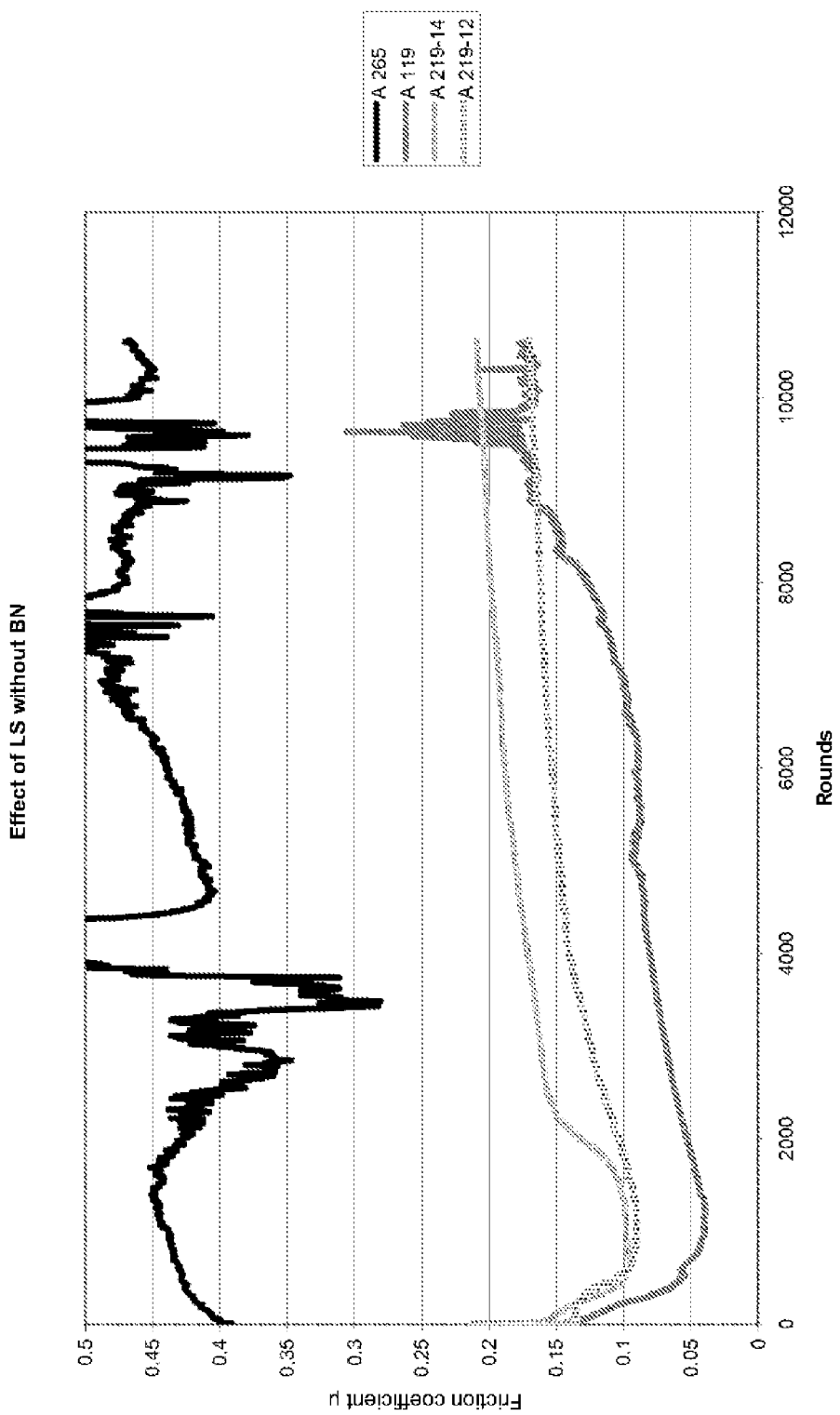
FIG. 13 systematic construction of $Si_3N_4$ M11-A system without BN.
Figure 14:
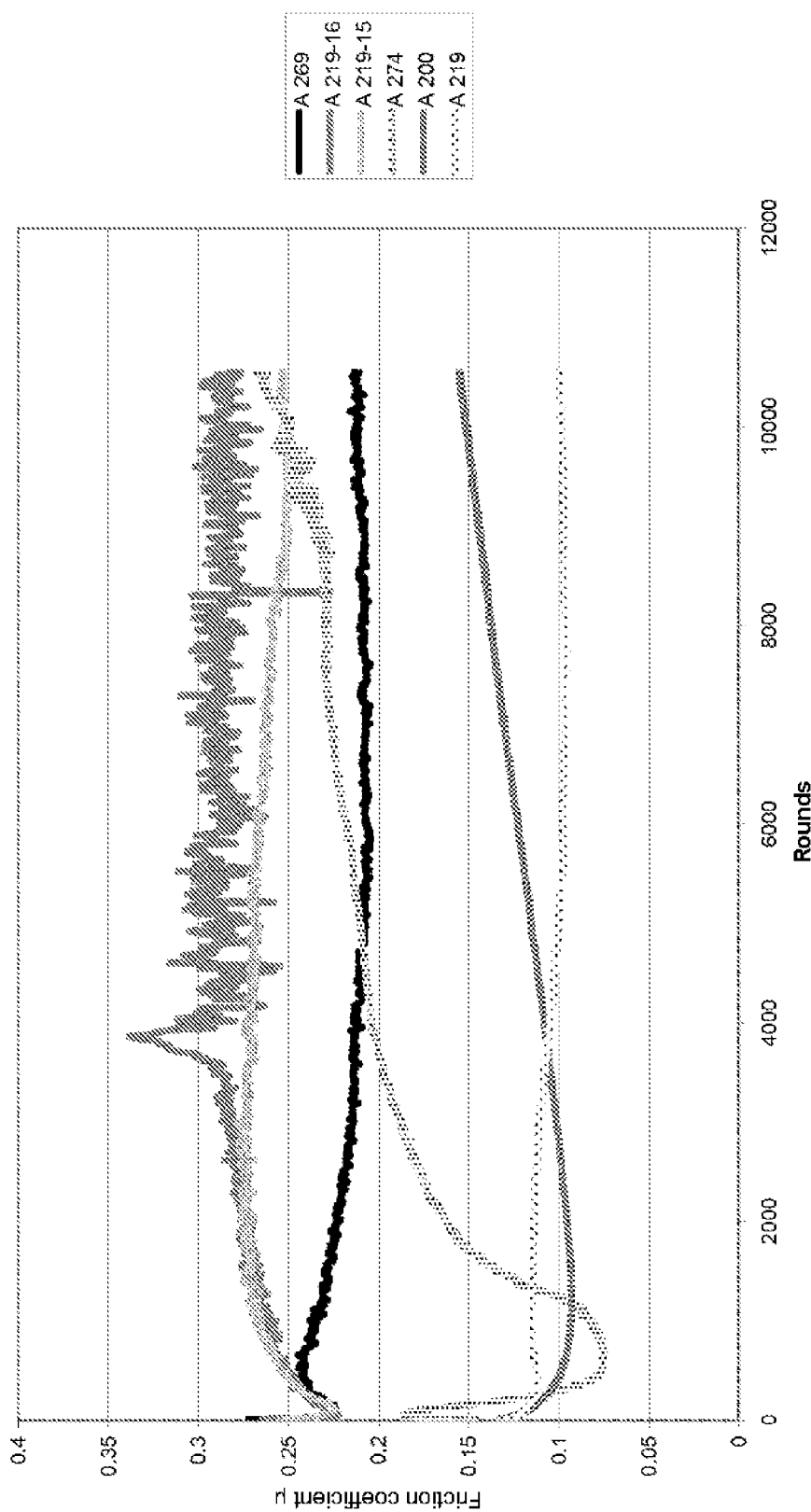
FIG. 14 systematic construction of $Si_3N_4$ M11-A system with BN.

Tables 10 and 11 and FIGS. 12 and 13 show the effect of particular individual components which are assembled systematically for the overall composite material.

These comparative series show a picture analogous to that already observed for SiC as hard material. The combination of FL with Lapis S leads to a marked reduction in the initial friction coefficient, but without any particular wear resistance (A274). Additional additization with solid-state lubricant BN 110 leads to a marked reduction in wear with a low initial friction coefficient (A200). The best balance in terms of coefficient of sliding friction and wear is obtained by additional combination of $Si_3N_4$ as hard material (A219).

Wetting Behavior and Abrasion

Tables 13 to 16 show additional properties of the tribological composite materials, such as the wetting behavior, the abrasion resistance as a function of the hard material particles content, and the corrosion protection effect, particularly as a function of the platelet content.

From the data shown it is apparent that the systems display not only hydrophobic but also oleophobic properties—that is, the surface-modifying components for the particles employed accumulate at the air side of the coatings. Some of the platelets are drawn to the layer surface as a result of the hydrophobic surface modification. This is demonstrated in FIG. 22.

Corrosion

Figure 24:
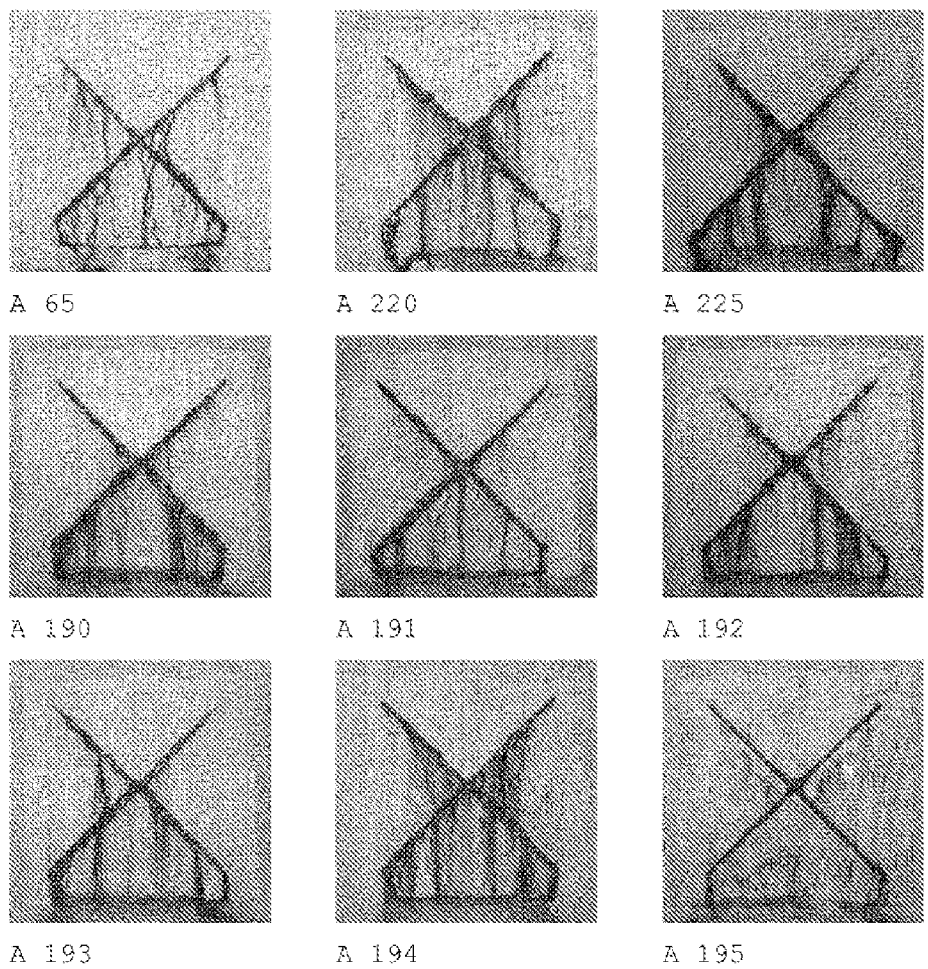
FIG. 24 neutral salt spray test after 312 h.

FIG. 24 shows the results of a neutral salt spray test.

The examples shown demonstrate the corrosion protection effect of the tribological layers produced. There is no observed blistering on the surface. At the edge of the scored cross, there is no undermining of the coating. The factors responsible for this may be said to be the fine-structured composition of the overall composite (barrier effect) and the excellent substrate adhesion.

TABLE 1

Variation of SiC UF-10 for 5% Lapis S and 10% FL

| System | BN 110 wt % | Lapis S wt % | SiC wt % | FL D10H wt % | BAPPS wt % | PMDA wt % |
|---|---|---|---|---|---|---|
| A200 | 30 | 5 | 0 | 10 | 37.97 | 17.03 |
| A201 | 30 | 5 | 1.25 | 10 | 37.10 | 16.65 |
| A202 | 30 | 5 | 2.5 | 10 | 36.25 | 16.25 |
| A169 | 30 | 5 | 5 | 10 | 34.52 | 15.48 |
| A204 | 30 | 5 | 10 | 10 | 31.07 | 13.93 |
| A205 | 30 | 5 | 15 | 10 | 27.62 | 12.38 |
| A206 | 30 | 5 | 20 | 10 | 24.15 | 10.85 |

TABLE 2

Variation of Lapis S in the SiC system

| System | BN 110 wt % | Lapis S wt % | SiC wt % | FL D10H wt % | BAPPS wt % | PMDA wt % |
|---|---|---|---|---|---|---|
| A65 | 30 | 0 | 5 | 10 | 37.97 | 17.03 |
| A190 | 30 | 1.25 | 5 | 10 | 37.10 | 16.65 |
| A191 | 30 | 2.5 | 5 | 10 | 36.25 | 16.25 |
| A192 | 30 | 3.5 | 5 | 10 | 35.53 | 15.97 |
| A193 | 30 | 5 | 5 | 10 | 34.52 | 15.48 |
| A194 | 30 | 10 | 5 | 10 | 31.07 | 13.93 |
| A195 | 30 | 15 | 5 | 10 | 27.62 | 12.38 |

TABLE 3

Systematic construction of SiC systems;
A193 = inventive composition; A113, A119, A274, and
A65 = comparative examples

| System | BN 110 wt % | Lapis S wt % | SiC wt % | FL D10H wt % | BAPPS wt % | PMDA wt % |
|---|---|---|---|---|---|---|
| A265 | 0 | 0 | 0 | 0 | 69.10 | 30.90 |
| A269 | 30 | 0 | 0 | 0 | 48.30 | 27.70 |
| A113 | 35 | 0 | 0 | 0 | 44.92 | 20.08 |
| A119 | 0 | 0 | 0 | 12.4 | 60.49 | 27.11 |
| A274 | 30 | 0 | 0 | 10 | 41.46 | 18.54 |
| A65 | 30 | 0 | 5 | 10 | 37.97 | 17.03 |
| A193 | 30 | 5 | 5 | 10 | 34.55 | 15.45 |

TABLE 4

Variation of $Si_3N_4$ nano70 content

| System | BN 110 wt % | Lapis S wt % | n-$Si_3N_4$ wt % | FL D10H wt % | BAPPS wt % | PMDA wt % |
|---|---|---|---|---|---|---|
| A200 | 30 | 5 | 0 | 10 | 37.97 | 17.03 |
| A228 | 30 | 5 | 1.25 | 10 | 37.10 | 16.65 |
| A229 | 30 | 5 | 2.5 | 10 | 36.25 | 16.25 |
| A230 | 30 | 5 | 5 | 10 | 34.52 | 15.48 |
| A231 | 30 | 5 | 10 | 10 | 31.07 | 13.93 |
| A232 | 30 | 5 | 15 | 10 | 27.62 | 12.38 |

TABLE 5

Variation of $Si_3N_4$ E05

| System | BN 110 wt % | Lapis S wt % | $Si_3N_4$ E05 wt % | FL D10H wt % | BAPPS wt % | PMDA wt % |
|---|---|---|---|---|---|---|
| A200 | 30 | 5 | 0 | 10 | 37.97 | 17.03 |
| A233 | 30 | 5 | 1.25 | 10 | 37.10 | 16.65 |
| A234 | 30 | 5 | 2.5 | 10 | 36.25 | 16.25 |
| A235 | 30 | 5 | 5 | 10 | 34.52 | 15.48 |
| A236 | 30 | 5 | 10 | 10 | 31.07 | 13.93 |
| A237 | 30 | 5 | 15 | 10 | 27.62 | 12.38 |

TABLE 6

Variation of $Si_3N_4$ E03

| System | BN 110 wt % | Lapis S wt % | $Si_3N_4$ E03 wt % | FL D10H wt % | BAPPS wt % | PMDA wt % |
|---|---|---|---|---|---|---|
| A200 | 30 | 5 | 0 | 10 | 37.97 | 17.03 |
| A238 | 30 | 5 | 1.25 | 10 | 37.10 | 16.65 |
| A239 | 30 | 5 | 2.5 | 10 | 36.25 | 16.25 |
| A240 | 30 | 5 | 5 | 10 | 34.52 | 15.48 |
| A241 | 30 | 5 | 10 | 10 | 31.07 | 13.93 |
| A242 | 30 | 5 | 15 | 10 | 27.62 | 12.38 |

TABLE 7

Variation of $Si_3N_4$ M11-A (broad distribution) content

| System | BN 110 wt % | Lapis S wt % | $Si_3N_4$-M wt % | FL D10H wt % | BAPPS wt % | PMDA wt % |
|---|---|---|---|---|---|---|
| A200 | 30 | 5 | 0 | 10 | 37.97 | 17.03 |
| A218 | 30 | 5 | 1.25 | 10 | 37.10 | 16.65 |
| A219 | 30 | 5 | 2.5 | 10 | 36.25 | 16.25 |
| A220 | 30 | 5 | 5 | 10 | 34.52 | 15.48 |
| A221 | 30 | 5 | 10 | 10 | 31.07 | 13.93 |
| A222 | 30 | 5 | 15 | 10 | 27.62 | 12.38 |

TABLE 8

Variation of $Si_3N_4$ B7 (3.0 µm) content

| System | BN 110 wt % | Lapis S wt % | $Si_3N_4$-B7 wt % | FL D10H wt % | BAPPS wt % | PMDA wt % |
|---|---|---|---|---|---|---|
| A200 | 30 | 5 | 0 | 10 | 37.97 | 17.03 |
| A223 | 30 | 5 | 1.25 | 10 | 37.10 | 16.65 |
| A224 | 30 | 5 | 2.5 | 10 | 36.25 | 16.25 |
| A225 | 30 | 5 | 5 | 10 | 34.52 | 15.48 |
| A226 | 30 | 5 | 10 | 10 | 31.07 | 13.93 |
| A227 | 30 | 5 | 15 | 10 | 27.62 | 12.38 |

TABLE 9

Variation of FL D10H content in the system without hard material

| System | BN 110 wt % | Lapis S wt % | $Si_3N_4$ wt % | FL D10H wt % | BAPPS wt % | PMDA wt % |
|---|---|---|---|---|---|---|
| A269 | 30 | 0 | 0 | 0 | 48.30 | 27.70 |
| A270 | 30 | 0 | 0 | 1.25 | 47.44 | 21.31 |
| A271 | 30 | 0 | 0 | 2.5 | 46.58 | 20.92 |
| A272 | 30 | 0 | 0 | 5.0 | 44.85 | 20.15 |
| A273 | 30 | 0 | 0 | 7.5 | 43.13 | 19.37 |
| A274 | 30 | 0 | 0 | 10.0 | 41.40 | 18.60 |
| A275 | 30 | 0 | 0 | 12.5 | 39.68 | 17.82 |
| A276 | 30 | 0 | 0 | 15.0 | 37.95 | 17.05 |

TABLE 10

Variation of FL D10H content in the $Si_3N_4$ B7 (3.0 µm) system

| System | BN 110 wt % | Lapis S wt % | $Si_3N_4$-B7 wt % | FL D10H wt % | BAPPS wt % | PMDA wt % |
|---|---|---|---|---|---|---|
| A219-16 | 30 | 5 | 0 | 0 | 44.92 | 20.08 |
| A243 | 30 | 5 | 1.25 | 1.25 | 43.19 | 19.31 |
| A244 | 30 | 5 | 1.25 | 2.5 | 42.32 | 18.93 |
| A245 | 30 | 5 | 1.25 | 5.0 | 40.60 | 18.15 |
| A246 | 30 | 5 | 1.25 | 7.5 | 38.87 | 17.38 |
| A223 | 30 | 5 | 1.25 | 10 | 37.10 | 16.65 |
| A247 | 30 | 5 | 1.25 | 15 | 33.69 | 15.06 |

TABLE 11

Systematic construction of $Si_3N_4$ M11-A system without BN

| System | BN 110 wt % | Lapis S wt % | $Si_3N_4$ M11 wt % | FL D10H wt % | BAPPS wt % | PMDA wt % |
|---|---|---|---|---|---|---|
| A265 | 0 | 0 | 0 | 0 | 69.10 | 30.90 |
| A119 | 0 | 0 | 0 | 12.4 | 60.49 | 27.11 |
| A219-14 | 0 | 5 | 0 | 10 | 58.74 | 26.26 |
| A219-12 | 0 | 5 | 2.5 | 10 | 57.01 | 25.49 |

TABLE 12

Systematic construction of $Si_3N_4$ M11-A system with BN

| System | BN 110 wt % | Lapis S wt % | $Si_3N_4$ M11 wt % | FL D10H wt % | BAPPS wt % | PMDA wt % |
|---|---|---|---|---|---|---|
| A269 | 30 | 0 | 0 | 0 | 48.30 | 27.70 |
| A219-16 | 30 | 5 | 0 | 0 | 44.92 | 20.08 |
| A219-15 | 30 | 5 | 2.5 | 0 | 43.19 | 19.31 |
| A274 | 30 | 0 | 0 | 10 | 41.46 | 18.54 |
| A200 | 30 | 5 | 0 | 10 | 37.97 | 17.03 |
| A219 | 30 | 5 | 2.5 | 10 | 36.25 | 16.25 |

TABLE 13

5 wt % Lapis S, 30% BN 110, 10% FL D10H

| System | Si$_3$N$_4$-M11 (1.3 µm)/ wt % | CPE (H$_2$O) initial | CPE (HD) initial | Weight loss after 1000 cycles Taber (CS-17)/ mg | CPE (H$_2$O) after Taber | CPE (HD) after Taber |
|---|---|---|---|---|---|---|
| A65  | 0    | 94  | 62 | 33 | 99  | 47 |
| A218 | 1.25 | 101 | 66 | 61 | 102 | 46 |
| A219 | 2.5  | 100 | 67 | 77 | 100 | 51 |
| A220 | 5    | 104 | 70 | 62 | 103 | 45 |
| A221 | 10   | 91  | 65 | 71 | 93  | 51 |
| A222 | 15   | 129 | 81 | 70 | 100 | 50 |

TABLE 14

5 wt % Lapis S, 30% BN 110, 10% FL D10H

| System | Si$_3$N$_4$-B7 (3.0 µm)/ wt % | CPE (H$_2$O) initial | CPE (HD) initial | Weight loss after 1000 cycles Taber (CS-17)/mg | CPE (H$_2$O) after Taber | CPE (HD) after Taber |
|---|---|---|---|---|---|---|
| A65  | 0    | 94  | 62 | 33 | 99  | 47 |
| A223 | 1.25 | 109 | 71 | 60 | 103 | 49 |
| A224 | 2.5  | 107 | 71 | 61 | 95  | 50 |
| A225 | 5    | 106 | 67 | 58 | 99  | 53 |
| A226 | 10   | 106 | 75 | 43 | 94  | 61 |
| A227 | 15   | 129 | 82 | 59 | 100 | 50 |

TABLE 15

5 wt % SiC, 30% BN, 10% FL D10H

| System | Lapis S/wt % | CPE (H$_2$O) initial | CPE (HD) initial | Weight loss after 1000 cycles Taber (CS-17)/mg | CPE (H$_2$O) after Taber | CPE (HD) after Taber |
|---|---|---|---|---|---|---|
| A65  | 0    | 94  | 62 | 33 | 99  | 47 |
| A190 | 1.25 | 102 | 66 | 50 | 100 | 50 |
| A191 | 2.5  | 103 | 67 | 36 | 100 | 46 |
| A192 | 3.5  | 103 | 70 | 60 | 100 | 53 |
| A193 | 5    | 108 | 71 | 44 | 99  | 50 |
| A194 | 10   | 114 | 73 | 37 | 103 | 50 |
| A195 | 15   | 127 | 80 | 60 | 104 | 50 |

TABLE 16

Comparative systems

| System | BN/wt % | Lapis S/wt % | Si$_3$N$_4$ M11-A/wt % | FL/wt % | CPE (H$_2$O) initial | CPE (HD) initial | Weight loss after 1000 cycles Taber (CS-17)/mg | CPE (H$_2$O) after Taber | CPE (HD) after Taber |
|---|---|---|---|---|---|---|---|---|---|
| 219    | 30 | 5 | 2.5 | 10 | 91 | 63 | 5.1 | 95  | 49 |
| 219-12 | 0  | 5 | 2.5 | 10 | 92 | 64 | 1.6 | 93  | 56 |
| 200    | 30 | 5 | 0   | 10 | 83 | 61 | 6.8 | 100 | 50 |
| 219-14 | 0  | 5 | 0   | 10 | 96 | 63 | 1.5 | 94  | 57 |
| 219-15 | 30 | 5 | 2.5 | 0  | 87 | 45 | 5.2 | 97  | 24 |
| 219-16 | 30 | 5 | 0   | 0  | 88 | 44 | 4.0 | 99  | 20 |

CITED LITERATURE

U.S. Pat. No. 4,694,038A
U.S. Pat. No. 5,789,523A
WO2002005293A2
US20040229759A1
U.S. Pat. No. 4,898,905A
U.S. Pat. No. 3,809,442
EP1350817A1
WO2005010107A1
WO2005010107A1
EP1718690

The invention claimed is:

1. A composition for producing a tribological composite material, comprising:
   a) at least one platelet-shaped, solid-state lubricant;
   b) at least one type of inorganic, platelet-shaped pigment particles;
   c) at least one surface-active compound possessing at least one hydrophilic group and at least one hydrophobic group; and
   d) a curable binder system comprising at least one organic polymer or oligomer having one or more functional groups, or a precursor thereof,
   wherein the pigment particles comprise transition metal oxides and form bonds to the at least one hydrophilic group of the at least one surface-active compound, resulting in a quasi-transfer film in interlayers between the solid-state lubricant and the pigment particles.

2. The composition as claimed in claim 1, wherein the solid-state lubricant has a thickness of between 100 nm and 1000 nm and an aspect ratio of greater than 5.

3. The composition as claimed in claim 1, wherein the pigment particles have a thickness of from 0.5 µm to 2 µm and an average aspect ratio of greater than or equal to 10.

4. The composition as claimed in claim 1, wherein the composition further comprises inorganic particles.

5. The composition as claimed in claim 4, wherein the inorganic particles have a hardness of from 1000 MPa to 3500 MPa.

6. The composition as claimed in claim 4, wherein the inorganic particles comprise Si$_3$N$_4$, SiC, B$_4$C, Al$_2$O$_3$ and/or SiO$_2$.

7. The composition as claimed in claim 4, wherein the inorganic particles comprise Si$_3$N$_4$.

8. The composition as claimed in claim 1, wherein the solid-state lubricant is selected from the group consisting of natural graphite, synthetic graphite, graphene, hexagonal boron nitride, turbostratic boron nitride, molybdenum disulfide and/or tungsten disulfide.

9. The composition as claimed in claim 1, further comprising an organic, solid-state lubricant selected from the group consisting of perfluoropolymers, polytetrafluoroethylene and/or polyethylene.

10. The composition as claimed in claim 1, wherein the surface of the pigment particles comprises at least partly of a transition metal oxide.

11. The composition as claimed in claim 10, wherein the transition metal oxide is selected from the group consisting of $TiO_2$, $ZrO_2$, ZnO, and $FeO_x$.

12. The composition as claimed in claim 1, wherein the surface-active compound is selected from the group consisting of ammonioalkyl compounds, phosphonioalkyl compounds, sulfonioalkyl compounds, imidazolinium compounds, pyridinium compounds, pyrrolidinium compounds, ionic liquids, functionalized, fluorine-containing polymers, polyethers, and functionalized polysiloxanes.

13. The composition as claimed in claim 1, wherein the binder system comprises an epoxy resin, phenolic resin, phenoxy resin, polyol, a blocked or nonblocked polyisocyanate, a polyimide, a polyamideimide, polyamide, polybenzimidazole, a polyester, polyurea, polyurethane, a polyepoxide, a polyamine and/or a polyacrylate, or precursors thereof.

14. The composition as claimed in claim 1, wherein the binder system comprises a dicarboxylic or tetracarboxylic acid, the anhydride thereof, or another derivative thereof, as carboxylic acid component, and comprises a diamine, triamine, or tetraamine as amine component, at least one component being aromatic.

15. A substrate with a tribological composite coating composed of a cured composition as claimed in claim 1.

16. The composition as claimed in claim 1, wherein:
the surface of the pigment particles comprises at least partly of a transition metal oxide; and
the surface-active compound is selected from the group consisting of ammonioalkyl compounds, phosphonioalkyl compounds, sulfonioalkyl compounds, imidazolinium compounds, pyridinium compounds, pyrrolidinium compounds, ionic liquids, functionalized, fluorine-containing polymers, polyethers, and functionalized polysiloxanes.

17. The composition as claimed in claim 1, wherein the solid-state lubricant comprises hexagonal boron nitride or turbostratic boron nitride.

18. The composition as claimed in claim 1, further comprising an organic, solid-state lubricant comprising a perfluoropolymer.

19. The composition as claimed in claim 1, wherein surface-active compounds adopt an orientation to a hydrophobic air side.

20. The composition as claimed in claim 1, wherein solid-state lubricants are arranged in a layer format between platelet-shaped pigment particles.

21. A method for producing a tribological composite material, comprising:
applying a composition as claimed in claim 1 to a substrate; and
thermally and/or photochemically curing the composition.

22. The method as claimed in claim 21, wherein said composition is obtained by:
preparing a mixture of at least one platelet-shaped, solid-state lubricant and a surface-active compound in a solvent suitable for the binder system;
adding the curable binder system and at least one type of inorganic, platelet-shaped pigment particles; and
applying the resulting mixture to a substrate.

* * * * *